(12) United States Patent
Zaima et al.

(10) Patent No.: US 7,535,477 B2
(45) Date of Patent: May 19, 2009

(54) DATA CONVERTER, DATA CONVERSION METHOD, PROGRAM FOR MAKING COMPUTER FUNCTION AS DATA CONVERTER AND RECORDING MEDIUM FOR STORING THIS PROGRAM

(75) Inventors: Hiroaki Zaima, Tenri (JP); Osamu Tsumori, Nara (JP); Shuichiro Ono, Soraku-gun (JP); Toru Ueda, Soraku-gun (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 328 days.

(21) Appl. No.: 10/582,353

(22) PCT Filed: Aug. 2, 2004

(86) PCT No.: PCT/JP2004/011038

§ 371 (c)(1),
(2), (4) Date: Jun. 9, 2006

(87) PCT Pub. No.: WO2005/057413

PCT Pub. Date: Jun. 23, 2005

(65) Prior Publication Data

US 2007/0097394 A1    May 3, 2007

(30) Foreign Application Priority Data

Dec. 12, 2003  (JP)  ............... 2003-415206

(51) Int. Cl.
*G09G 5/00*   (2006.01)
*G09G 5/02*   (2006.01)
*G06F 15/16*  (2006.01)

(52) U.S. Cl. .............. 345/619; 345/603; 709/246

(58) Field of Classification Search ........... 345/619; 709/246
See application file for complete search history.

(56) References Cited

U.S. PATENT DOCUMENTS 5,548,753 A  *  8/1996  Linstead et al. ............ 707/1

(Continued)

FOREIGN PATENT DOCUMENTS

EP    0 838 774 A2    4/1998

(Continued)

OTHER PUBLICATIONS

JP-2002-330251 Cited Office Action in Corresponds Application dated Feb. 22, 2005.

*Primary Examiner*—M Good Johnson
(74) *Attorney, Agent, or Firm*—Birch, Stewart, Kolasch & Birch, LLP

(57) ABSTRACT

A data converter for converting a file having layout information to a file which does not depend on the process properties of an information apparatus is provided. The process which is executed by the control part in the data converter includes the step of determining the attributes of the apparatus to which mail is transmitted if a file is attached to received mail, the step of executing a conversion process if data conversion is necessary, the step of generating a message that mail is incoming which includes information on the location where the file that has been generated through the conversion process is stored, the step of transmitting the message that mail is incoming to the recipient's apparatus, the step of storing the file without converting data if data conversion is unnecessary, and the step of transmitting the received mail to the recipient's apparatus.

14 Claims, 17 Drawing Sheets

U.S. PATENT DOCUMENTS

| | | | |
|---|---|---|---|
| 5,790,790 A | 8/1998 | Smith et al. | |
| 6,226,400 B1* | 5/2001 | Doll | 382/163 |
| 6,363,414 B1* | 3/2002 | Nicholls et al. | 709/206 |
| 6,598,076 B1 | 7/2003 | Chang et al. | |
| 7,047,014 B1* | 5/2006 | Friday et al. | 455/446 |
| 2002/0051181 A1* | 5/2002 | Nishimura | 358/1.15 |
| 2004/0151377 A1* | 8/2004 | Boose et al. | 382/193 |

FOREIGN PATENT DOCUMENTS

| | | |
|---|---|---|
| EP | 0 838 774 A3 | 4/1998 |
| EP | 1 150 465 A2 | 10/2001 |
| EP | 1 150 465 A3 | 10/2001 |
| JP | 4-119457 A | 4/1992 |
| JP | 10-154110 A | 6/1998 |
| JP | 11-168498 A | 6/1999 |
| JP | 2001-75892 A | 3/2001 |
| JP | 2001-216230 A | 8/2001 |
| JP | 2001-217876 A | 8/2001 |
| JP | 2001-312446 A | 11/2001 |
| JP | 2002-91885 A | 3/2002 |
| JP | 2002-344526 A | 11/2002 |
| JP | 2003-157222 A | 5/2003 |
| WO | WO-02/13031 A1 | 2/2002 |
| WO | WO-03/005276 A2 | 1/2003 |
| WO | WO-03/005276 A3 | 1/2003 |

* cited by examiner

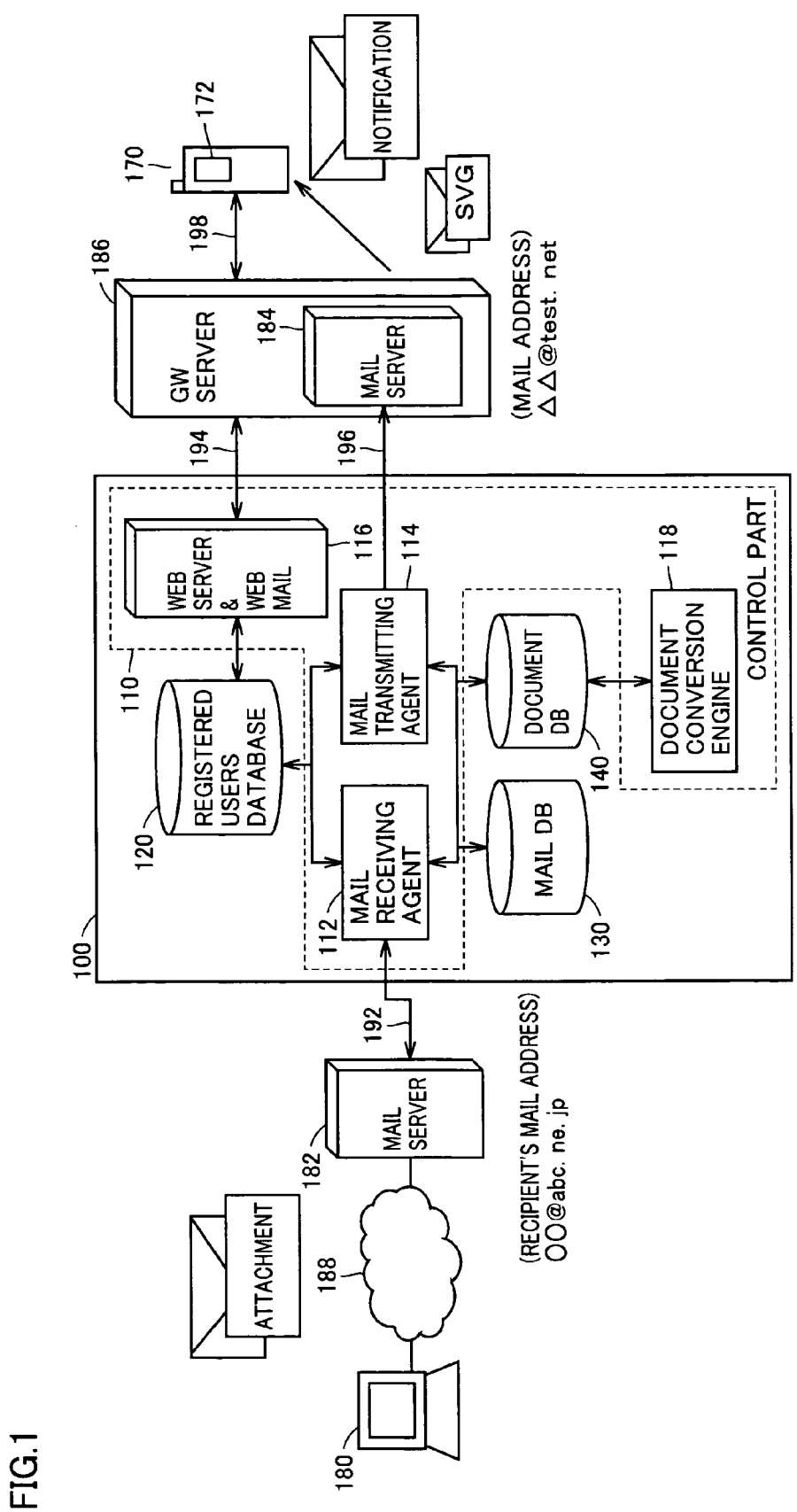

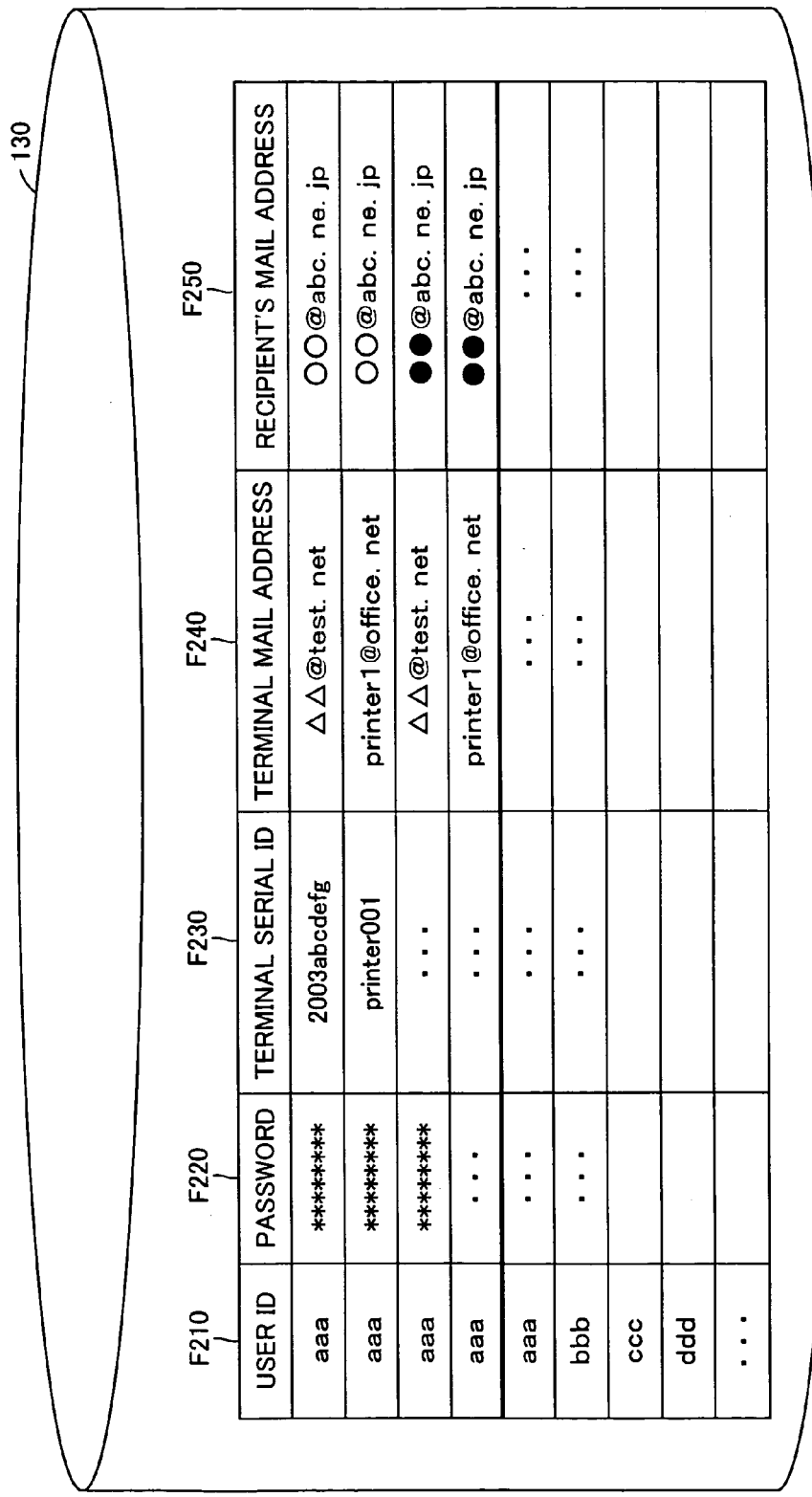

FIG.3

| F310 | F320 | F330 | F340 | F350 | F360 |
|---|---|---|---|---|---|
| RECIPIENT | SENDER | TIME AND DATE OF MAIL TRANSMISSION | SUBJECT | MAIN TEXT | WHERE FILE IS STORED |
| ... | ... | ... | ... | ... | ... |
| ○○@abc.ne.jp | ... | ... | NOTICE OF DATES OF SIXTH QMS PERIODIC EXAMINATION MEETING | ... | 1000 |
| ○○@abc.ne.jp | ... | ... | INFORMATION ON IT ASSET MANAGING TOOL | ... | NULL |
| ○○@abc.ne.jp | ... | ... | REGARDING RETURN OF QUALITY REFORMATION PLAN IN FISCAL MONTH OF JULY | ... | ... |
| ○○@abc.ne.jp | ××@sender.jp | 2003/8/6 16:56 | RE: APPOINTMENT PLEASE | HOW ABOUT 8/20? PLEASE CONSIDER THE ABOVE. | 1200 |
| ○○@abc.ne.jp | ... | ... | RE: SL760 EVALUATION REPORT | ... | ... |
| ○○@abc.ne.jp | ... | ... | Teleconference Subject | ... | ... |
| ... | ... | ... | ... | ... | ... |

130

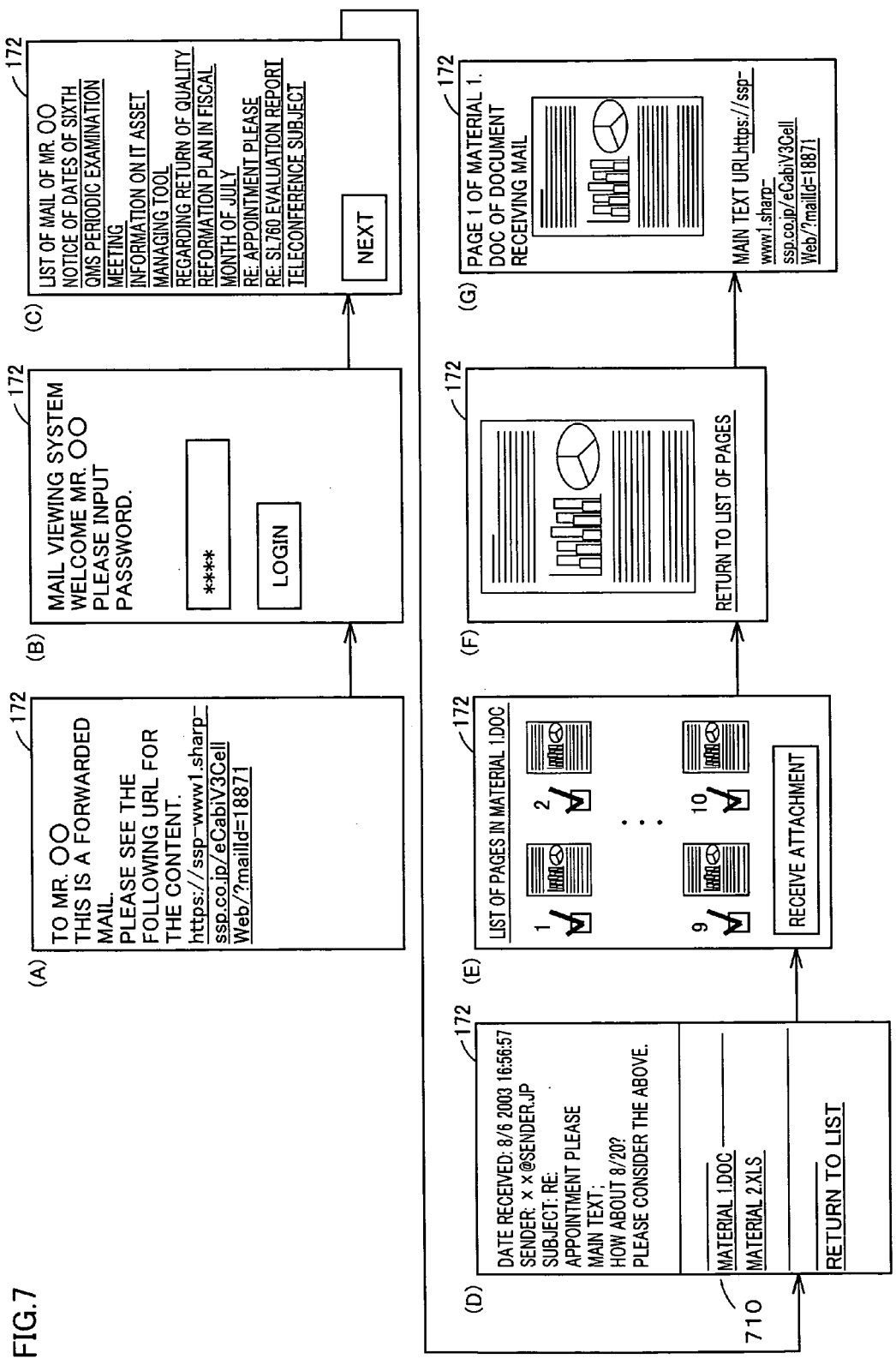

FIG.8

| | | |
|---|---|---|
| 01 | From: ×× @sender. jp | |
| 02 | To : ○○@abc. ne. jp | |
| 03 | Subject:test | |
| 04 | Date: Wed, 03 Dec 2003 16:55:49 +0900 | 810 |
| 05 | MIME-Version:1.0 | |
| 06 | X-Mailer:mailer name | |
| 07 | Content-Type: multipart/mixed; boundary=" | 820 |
| 08 | X-UIDL: g/P!!JM9!!9!'"!#G—"! | |
| 09 | Status: RO | |
| 10 | | |
| 11 | ————Boundary_Vedk7D,Yd_p1rv' | |
| 12 | Content-Type: text/plain;charset=ISO-2022-JP | |
| 13 | Content-Transfer-Encoding: 7bit | |
| 14 | | |
| 15 | MAIN TEXT OF MAIL | |
| 16 | | |
| 17 | ————Boundary_Vedk7D,Yd_p1rv' | 830 |
| 18 | Content-Type: image/jpeg; name="sample.jpg" | |
| 19 | Content-Transfer-Encoding: base64 | |
| 20 | Content-Disposition: attachment; filename="sample.jpg" | |
| 21 | | |
| 22 | /9j/4AAQSkZJRgABAgEASABIAAD/7QZKUGhvdG9zaG9wIDMuMAA4QkINA+0AAAAAB | |
| 23 | AASAAAAAEAAgBIAAAAAQACAOEJJTQQNAAAAAAAEAAAAeDhCSU0EGQAAAAABAA | |
| 24 | AAB44QkINA/MAAAAAAkAAAAAAAAAAAAEAOEJJTQQK////////// | |

840 → line 11, 850 → line 17, 860 → line 18, 870 → line 18 sample.jpg, 880 → line 20, 890 → lines 22-24

FIG.9

|   | 1  | 2  | 3  | 4  | 5  |
|---|----|----|----|----|----|
| 1 | FF | D8 | FF | E0 | 00 |
| 2 | 10 | 4A | 46 | 49 | 46 |
| 3 | 00 | 01 | 02 | 01 | 00 |
| 4 | 48 | 00 | 48 | 00 | 00 |
| 5 | FF | ED | 06 | 4A | 50 |
| ⋮ |    |    | ⋮  |    |    |

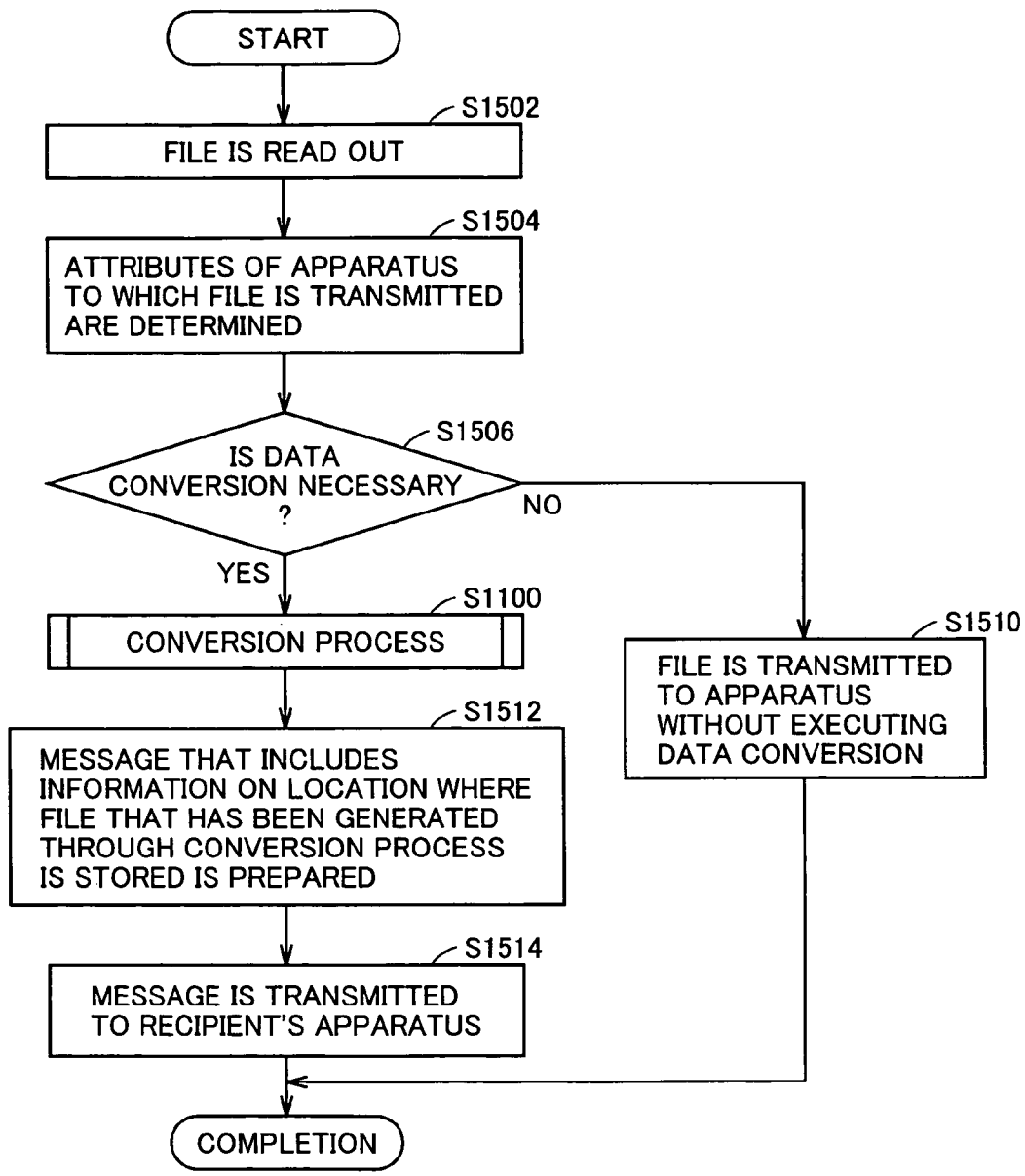

DATA CONVERTER, DATA CONVERSION METHOD, PROGRAM FOR MAKING COMPUTER FUNCTION AS DATA CONVERTER AND RECORDING MEDIUM FOR STORING THIS PROGRAM

TECHNICAL FIELD

The present invention relates to a technology for converting data in accordance with an information apparatus to which the data is outputted and outputting the resulting data, and in particular, to a data converter which can convert data to a file that is expressible in a plurality of data formats, a data conversion method, a program for making a computer function as a data converter and a recording medium for storing this program.

BACKGROUND ART

Document data and other electronic data can be referred to by a computer which is provided with a certain application that is in conformity with the format of this data, or by other information processing apparatuses. Such information processing apparatuses may store this application in advance in some cases, or may require installing of this application in order to perform browsing in accordance with this data in other cases. Therefore, when an information processing apparatus outputs document data or the like, in some cases, it may not be possible for this document data to be browsed, depending on the performance of the information processing apparatus to which the data is outputted.

Therefore, to solve these problems, Japanese Patent Laying-Open No. 4-119457 (Patent Document 1), for example, discloses a document processing apparatus which is connected to a display apparatus and a printing apparatus and can generate a document by organizing color text, color graphics and color pictures. This document processing apparatus includes an indication means for indicating in what way color text, color graphics and color pictures are organized or composed in an independent state from the display apparatus or the printing apparatus, a processing means for organizing and composing a document, including text, graphics and images, on the basis of the content indicated by the indication means, and an output means for outputting a color document which includes composed graphics, text and pictures in accordance with the performance of the display apparatus or the printing apparatus.

In the document processing apparatus disclosed in the Patent Document 1, when the indication means indicates a mode for organization and composition, the processing means organizes and composes a document on the basis of this indication. The outputting means outputs this document in accordance with the performance of the apparatus to which the document is outputted. As a result, a document processing apparatus for editing color text, color pictures or color images and outputting the resulting data in accordance with the apparatus to which the data is outputted is provided.

In addition, Japanese Patent Laying-Open No. 2002-344526 (Patent Document 2) discloses a control method for delivering information that has been transmitted through electronic mail to a communication terminal to which the information is transmitted, irrespectively of the amount of data in the electronic mail or the processing performance of the communication terminal to which the information is transmitted. This method is a control method for a mail delivery system for delivering received electronic mail to a communication terminal which corresponds to the mail address of this mail. This method includes the step of preparing electronic mail which includes a portion of the above-described received electronic mail and acquisition information for acquiring the remaining portion, the electronic mail having the same address as the received electronic mail, on the basis of the conditions information which is described in the mail delivery system as the conditions for delivery of electronic mail to the above-described communication terminal, and the step of delivering the electronic mail that has been generated in the above-described step to the above-described communication terminal.

In accordance with the control method that is disclosed in the Patent Document 2, electronic mail that includes a portion of the electronic mail that is received by the mail delivery system and acquisition information for acquiring the remaining portion is generated on the basis of the conditions information. This electronic mail is delivered to the communication terminal to which the mail is addressed.

Patent Document 1: Japanese Patent Laying-Open No. 4-119457
Patent Document 2: Japanese Patent Laying-Open No. 2000-344526

DISCLOSURE OF THE INVENTION

Problems to be Solved by the Invention

In recent years, cellular phones and other compact portable communication terminals have been widely used. Such portable communication terminals have restrictions in terms of the size of monitors and fonts that can be displayed. Therefore, in some cases, such portable communication terminals cannot optimally display documents that have been processed by the document processing apparatus disclosed in Japanese Patent Laying-Open No. 4-119457 or other apparatuses.

In addition, in accordance with the control method that is disclosed in Patent document 2, a portion of electronic mail can be acquired later. In addition, only if the format of an attached file is a format that allows for delivery to a communication terminal, electronic mail that includes this file can be generated. However, if the format of an attached file is a format that does not allow for delivery to a communication terminal, there is no method for confirming the content in the communication terminal.

The present invention is provided in order to solve the above-described problems, and an object thereof is to provide a data converter which can convert a file having layout information to a file having such a format that it can be displayed without depending on the file processing function in the information apparatus.

Another object of the present invention is to provide a data conversion method according to which a file having layout information can be converted to a file having such a format that it can be displayed without depending on the file processing function in the information apparatus.

Still another object of the present invention is to provide a program for causing a computer which can convert a file having layout information to a file having such a format that it can be displayed without depending on the file processing function in the information apparatus to function as a data converter.

Yet another object of the present invention is to provide a recording medium for storing a program for causing a computer to function as a data converter which can convert a file having layout information to a file having such a format that it can be displayed without depending on the file processing function in the information apparatus.

Means for Solving the Problems

In order to achieve the above-described objects, according to an aspect of this invention, a data converter includes a memory means for storing an original file having at least layout information and attribute data describing at least one function of one or more information apparatuses, and a conversion means for converting the original file on the basis of the attribute data. The conversion means includes a first file conversion means for generating a file that is expressed in a predetermined first data format as a result of conversion processing on the basis of data that is included in the original file, and a second file conversion means for generating a file that is expressible in a predetermined second data format as a result of conversion processing on the basis of data that is included in the original file. The data converter further includes an output means for outputting a file that has been outputted from the conversion means to an information apparatus which corresponds to the attribute data.

In the above-described data converter, the first file conversion means executes a conversion process on the basis of data that is included in the original file and generates a file that is expressible in a predetermined first data format. Here, the original file includes at least any of text data, graphics data and image data. The layout information includes information on, for example, the size of the entirety of the document and the size and location of text, graphics, images and the like, in addition to the color of letters, decorations, the type of font and other writing style information. The second file conversion means executes a conversion process on the basis of data that is included in the original file and generates a file that is expressible in a predetermined second data format. The output means outputs a file that is outputted from the conversion means to an information apparatus which corresponds to the attribute data. This attribute data describes any of the functions of at least one or more information apparatus. Here, function means the size of the region where display by the display apparatus provided in an information apparatus is possible, the capacity that can be transmitted in a communication line, the capacity of a memory provided in an information apparatus, and other functions relating to information processing. In this manner, this information apparatus can appropriately display a received file without depending on the function that can be processed. As a result, a data converter that can convert a file having layout information to a file in a format that can be displayed without depending on the file processing function in an information apparatus can be provided.

Preferably, the first file conversion means converts the original file to a file that is expressible with raster data on the basis of layout information. The second file conversion means converts the original file to a file that is expressible with vector data on the basis of layout information.

In the above-described data converter, the original file is converted to a file that is expressible with raster data and a file that is expressible with vector data. Here, raster data refers to, for example, data for expressing pictures with alignments of colored dots and other displaying elements. Vector data refers to expression of pictures with dots, lines connecting dots, parameters for equations for planes and other picture information. Here, in the vector data, pictures may be expressed with the contents of raster data, and the location thereof, as well as with the size and the direction. As a result, an information apparatus which receives a file of raster data can expand or scale down the data as a bitmap picture, and thereby display the contents of this file. In addition, an information apparatus which receives a file of vector data can clearly expand or scale down the data as a vector picture, and thereby display the contents of this file.

Preferably, the data converter further includes a determination means for determining whether or not it is necessary to convert the original file by means of either the first file conversion means or the second file conversion means on the basis of attribute data. The first file conversion means converts the original file to a file that is expressible with raster data on the basis of data that is included in the original file if the determination means determines that conversion by the first file conversion means is necessary. The second file conversion means converts the original file to a file that is expressible with vector data on the basis of data that is included in the original file if the determination means determines that conversion by the second file conversion means is necessary.

In the above-described data converter, conversion of the original file is selectively executed, and therefore, preparation of a file that is not required by the information apparatus can be prevented. Accordingly, the memory region in a file storing apparatus can be efficiently used.

Preferably, the data converter further includes a determination means for determining whether or not it is necessary to convert the original file on the basis of the attribute data. The first file conversion means converts the original file to a file that is expressible with raster data on the basis of data that is included in the original file if the determination means determines that it is necessary to convert the original file. The second file conversion means converts the original file to a file that is expressible with vector data on the basis of data that is included in the original file if the determination means determines that it is necessary to convert the original file.

In the above-described data converter, a file that is expressible with raster data and a file that is expressible with vector data are generated from the original file, and therefore, a file may be outputted to an information apparatus depending on the needs of the file.

Preferably, the output means includes a transmission means for outputting data for scaling down the output file for display to an information apparatus which corresponds to the attribute data via a communication line.

In the above-described data converter, when the transmission means transmits data for scaling down the file for display to an information apparatus, the information apparatus displays scaled down pictures on the basis of this data. As a result, the user of the information apparatus can easily recognize the outline of the file after conversion with a small amount of communication.

Preferably, the data converter further includes a reception means for receiving a request for transmission of an outputted file via a communication line. The transmission means transmits a file that is expressible with vector data to an information apparatus which corresponds to the attribute data on the basis of the request for transmission.

In the above-described data converter, a file that is expressible with vector data is transmitted to an information apparatus, and therefore, this information apparatus can clearly expand and display pictures on the basis of this file. Here, the request for transmission may include at least one piece of information on the origin of transmission of the request for transmission, information which specifies the origin of transmission of the file, and information which specifies the attribution data used for conversion. In addition, if information which specifies the attribute data is included in both of the request for transmission and the converter, the information that is included in the request for transmission may be prioritized.

Preferably, the data converter further includes a file storing means for storing an outputted file, a preparation means for preparing access data for access to the data converter or an outputted file, and an access data transmission means for transmitting access data to an information apparatus which corresponds to the attribute data via a communication line.

In the above-described data converter, access can be restricted by certain users, and therefore, security can be increased. In this manner, a file which needs to be kept highly secret can be easily protected.

Preferably, the output means includes a transmission means for outputting data for scaling down the output file for display to an information apparatus which corresponds to the attribute data via a communication line.

In the above-described data converter, when the transmission means transmits data for scaling-down the file for display to an information apparatus, the information apparatus displays scaled-down pictures on the basis of this data. As a result, the user of the information apparatus can easily recognize the outline of the file after conversion with a small amount of communication.

Preferably, the outputted file includes a plurality of files. The transmission means outputs data for scaling-down each of the plurality of files for display. The data converter further includes a reception means for receiving a request for transmission of any of the plurality of files via a communication line. The transmission means transmits a file that is expressible with vector data to an information apparatus which corresponds to the attribute data on the basis of the request for transmission.

In the above-described data converter, a file that is expressible with vector data is selectively transmitted to an information apparatus. Accordingly, the information apparatus can receive only a required file and can clearly expand pictures for display on the basis of this file.

Preferably, the data converter further includes a generation means for generating a message which requires an input of validation information for access to an outputted file on the basis of a predetermined system, and an addition means for adding a message to an outputted file. The output means outputs the file to which a message has been added to an information apparatus which corresponds to the attribute data. The data converter further includes a means for receiving input information which is inputted by the user of the information apparatus which corresponds to the attribute data, and a validation means for validating access to an outputted file on the basis of the validation information and the input information.

In the above-described data converter, an information apparatus can be notified of the existence of a converted file while maintaining security, and therefore, the user of the information apparatus can always be notified of the existence of updated information.

Preferably, the data converter is connected to a printing apparatus via a communication line. The output means includes a means for outputting an outputted file to a printing apparatus.

In the above-described data converter, the original file that has been generated without depending on the attributes of a printing apparatus can be converted in accordance with the attribute data of the printing apparatus, and thereby, the contents thereof can be printed by the printing apparatus.

Preferably, the data converter further includes a confirmation means for confirming whether or not an outputted file satisfies predetermined conditions. The first file conversion means includes a condition changing means for changing the conditions for converting the original file if the outputted file does not satisfy the predetermined conditions, and a means for converting the original file on the basis of the changed conditions.

In the above-described data converter, the original file is converted to raster data if conversion to a file that is expressible with vector data does not satisfy the predetermined conditions. The file that is expressible with raster data can be repeatedly converted by changing the width and height or the data compression ratio until the predetermined conditions are satisfied, and therefore, a file that can be outputted to an information apparatus without fail can be generated.

Preferably, the conditions for converting the original file include the data compression ratio of the original file. Under the predetermined conditions, the size of an outputted file is smaller than the predetermined size. The condition changing means increases the data compression ratio if the size of an outputted file is greater than the predetermined size.

In the above-described data converter, the data compression ratio is changed, and thereby, a file of which the size does not exceed the predetermined size is generated, and therefore, this file can be outputted without fail.

Preferably, the data converter further includes a reception means for receiving the original file via a communication line.

In the above-described data converter, the original file that has been transmitted by a sender is converted, and therefore, the recipient can receive a file having such a format that it can be displayed without depending on the processing function. In this manner, the frequency of use of a file can be increased in an information communication network where files having various data formats are added to electronic mail.

Preferably, the data converter further includes a determination means for determining whether or not it is necessary to convert the original file on the basis of the attribute data. The conversion means outputs the original file without converting it when the determination means determines that it is not necessary to convert the original file.

In the above-described data converter, the load for the process for converting the original file is eliminated, and therefore, deterioration in the operation properties of the data converter can be prevented.

Preferably, the conversion means converts the original file for each section of data that has been predetermined in the original file.

In the above-described data converter, a file that is generated through conversion of the original file is also generated for each section thereof (for example, section of a page), and therefore, the user of the information apparatus can easily confirm the content of this original file.

According to another aspect of this invention, a data conversion method includes the step of preparing an original file having at least layout information and attribute data describing at least one function of one or more information apparatuses in advance, and the conversion step of converting the original file on the basis of the attribute data. The conversion step includes the step of generating a file that is expressible in a predetermined first data format through a conversion process on the basis of data included in the original file, and the step of generating a file that is expressible in a predetermined second data format through a conversion process on the basis of data included in the original file. The above-described method further includes the step of outputting the file that has been outputted from the conversion step to an information apparatus which corresponds to the attribute data.

According to the above-described data conversion method, a file that is expressible in a predetermined first data format and a file that is expressible in a predetermined second data format can be generated from the original file having at least layout information. These files can be outputted to an information apparatus which corresponds to the attribute data. In this manner, this information apparatus can appropriately display a received file without depending on the functions that allow for processing. As a result, a data conversion method according to which a file having layout information can be converted to a file having such a format that it can be displayed without depending on the file processing function in an information apparatus can be provided.

According to still another aspect of this invention, a program causes a computer to function as a data converter. This program causes the computer to execute the step of preparing an original file having at least layout information and attribute data describing at least one function of one or more information apparatuses in advance, and the conversion step of converting the original file on the basis of the attribute data. The conversion step includes the step of generating a file that is expressible in a predetermined first data format through a conversion process on the basis of data included in the original file, and the step of generating a file that is expressible in a predetermined second data format through a conversion process on the basis of data included in the original file. Furthermore, this program causes the computer to execute the step of outputting the file that has been outputted from the conversion step to an information apparatus which corresponds to the attribute data.

When the above-described program is run in a computer, a file that is expressible in a predetermined first data format and a file that is expressible in a predetermined second data format can be generated from the original file having at least layout information. These files can be outputted to an information apparatus which corresponds to the attribute data. In this manner, this information apparatus can appropriately display a received file without depending on the functions that allow for processing. As a result, a computer can function as a data converter which can convert a file having layout information to a file having such a format that it can be displayed without depending on the file processing function in an information apparatus.

According to yet another aspect of this invention, a computer-readable recording medium is provided as a recording medium which stores a program for causing a computer to function as a data converter.

When a recording medium which has stored the above-described program is inserted in a computer, this computer can function as a data converter which can convert a file having layout information to a file having such a format that it can be displayed without depending on the file processing function in an information apparatus.

Effects of the Invention

In accordance with the data converter according to the present invention, a file having layout information is converted in accordance with a portable communication terminal, a printing apparatus and other information apparatuses, and therefore, the user of this information apparatus can refer to the content of this file without using a specific application for viewing this document data.

In accordance with the data conversion method according to the present invention, a file having layout information is converted in accordance with a portable communication terminal, a printing apparatus and other information apparatuses, and therefore, the user of this information apparatus can refer to the content of this file without using a specific application for viewing this document data.

In accordance with the program according to the present invention, a computer can function as a data converter which can convert a file having layout information to a file having such a format that it can be displayed without depending on the file processing function in an information apparatus. Accordingly, the user who receives a file that has been converted in this computer can view the content of this file without using a specific application.

In accordance with the recording medium according to the present invention, a computer can function as a data converter which can convert a file having layout information to a file having such a format that it can be displayed without depending on the file processing function in an information apparatus.

BRIEF DESCRIPTION OF THE DRAWINGS

FIG. 1 is a diagram schematically showing a communication system where a data converter according to the first embodiment of the present invention is used;

FIG. 2 is a diagram conceptually showing the structure of data that is stored in the database for registered persons in the data converter shown in FIG. 1;

FIG. 3 is a diagram conceptually showing the structure of communication information that is stored in the database for mail in the data converter shown in FIG. 1;

FIG. 7 is a diagram showing the transition between screens that are displayed on the monitor of a portable communication terminal which is connected to the data converter shown in FIG. 1;

FIG. 8 is a diagram conceptually showing the data structure of electronic mail which is sent via the data converter shown in FIG. 1;

FIG. 9 is a diagram conceptually showing a portion of the header portion of a binary sequence in JPEG picture data that is converted in the data converter shown in FIG. 1;

FIG. 16 is a flow chart illustrating the procedure of a process which is executed by the control part of the data converter according to the third embodiment of the present invention.

DESCRIPTION OF THE REFERENCE SIGNS

Figure 4:
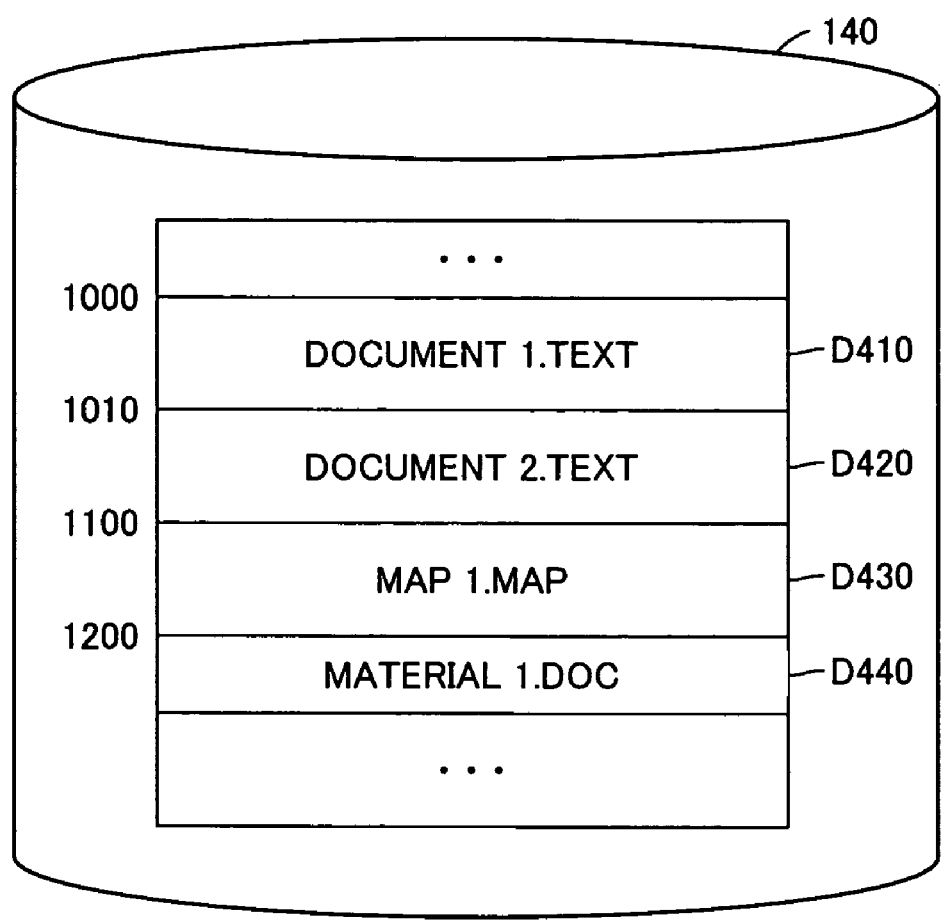
FIG. 4 is a conceptual diagram showing the data structure in the database for documents in the data converter shown in FIG. 1.

100, 1500: data converter; 110, 1510: control part; 112: mail receiving agent; 114: mail transmitting agent; 116: WEB server and WEB mail agent; 118: document converting engine; 120: DB for registered persons; 130: DB for mail; 140 DB for documents; 170: portable communication terminal; 172: monitor; 180: information communication terminal; 182, 184: mail server; 186: GW server; 188, 192, 194, 196, 198: network; 600: computer system; 610: CPU; 620: RAM; 630: fixed disc; 640: FD driving device; 642: FD; 650: CD-ROM driving device; 652: CD-ROM

BEST MODE FOR CARRYING OUT THE INVENTION

In the following, the embodiments of the present invention are described with reference to the drawings. In the following description, the same symbols are attached to parts that are the same. The names and functions of these are also the same. Accordingly, detailed descriptions of these are not repeated.

First Embodiment

With reference to FIG. 1, a data converter 100 according to the first embodiment of the present invention is described. FIG. 1 is a diagram schematically showing a communication system where data converter 100 is used.

As shown in FIG. 1, data converter 100 includes a control part 110, a DB (database) for registered persons 120, a DB for mail 130 and a DB for documents 140. control part 110 includes a mail receiving agent 112, a mail transmitting agent 114, a WEB server and WEB mail agent 116, and a document converting engine 118.

This data converter 100 is connected to a mail server 182 via a network 192. Likewise, data converter 100 is connected to a GW (gateway) server 186 via networks 194 and 196. Mail server 182 is connected to an information communication terminal 180 via a network 188. This information communication terminal 180 includes, for example, a PC (personal computer), but is not limited to this, and may be an information processing device having a communication function. GW server 186 is connected to a portable communication terminal 170 via a network 198. This portable communication terminal 170 includes, for example, cellular phones, PDA's (personal digital assistants) or the like, but is not limited to these. Here, each network may be a public communication line or a dedicated line that is used within a certain organization, such as a LAN (local area network).

In a system having a communication environment as described above, when the user of information communication terminal 180 writes electronic mail and attaches a file having layout information, such as a document file, to this mail, which is then transmitted to a mail address "○○@abc-.ne.jp," this electronic mail is received by data converter 100 via mail server 182.

Here, layout information includes information on writing style, such as letter color, decoration and type of font, in addition to the size of the entirety of the document and the size and location of respective portions. In addition, a document file which includes this information includes, for example, a document which is generated by an editing device, a table which is generated by a processing device, such as a PC having a spreadsheet function and the like.

In data converter 100, when mail receiving agent 112 in control part 110 receives this electronic mail via a communication IF (interface) (not shown), mail receiving agent 112 stores the mail text in DB for mail 130. Furthermore, mail receiving agent 112 stores the attached file in DB for documents 140.

Document converting engine 118 converts the attached file to a predetermined data format on the basis of the attribute information which is stored in DB for registered persons 120. The file that is generated by document converting engine 118 is stored again in DB for documents 140.

Mail transmitting agent 114 generates information for notifying that electronic mail has been transmitted from information communication terminal 180 to portable communication terminal 170 on the basis of a predetermined format. Mail transmitting agent 114 transmits this information to a mail server 184 as electronic mail having the address "ΔΔ@test.net." Mail server 184 forwards this mail to portable communication terminal 170. Here, the predetermined format may include the mail address of the sender and the main text of the mail, or URL (uniform resource locator) for accessing data that has been converted from an attached file if there is such converted data.

When the user of portable communication terminal 170 accesses GW server 186 via network 198, the converted file that is stored in DB for documents 140 is read out and can be viewed. At this time, the attribute information of portable communication terminal 170 may be updated in DB for registered persons 120, if necessary.

With reference to FIG. 2, the data structure in DB for registered persons 120 in data converter 100 according to the present embodiment is described. FIG. 2 is a diagram conceptually showing the structure of data that is stored in DB for registered persons 120. Here, DB for registered persons 120 is a memory device having a relatively large capacitance, such as, for example, a hard disc.

As shown in FIG. 2, user ID (identification) is stored in a field F210. The password of the user of each portable communication terminal is stored in a field F220. The serial ID of the portable communication terminal used by each user is stored in a field F230. This serial ID is, for example, the serial number of the portable communication terminal, but is not limited to this.

The terminal mail address is stored in a field F240. Such information may be registered in advance at the time of registration for use of a portable communication terminal with which data converter 100 is accessed. Alternatively, as described above, the user may input information whenever the portable communication terminal electronic receives mail and the user wishes to access this. Here, the format of this terminal mail address may be an address other than an electronic mail address, for example, an IP (internet protocol) address. In FIG. 2, for example, though the address of the printer having the ID "printer 001" is an address in electronic mail format, it may be a network address which is defined in the network environment where this printer is used.

The recipient's mail address is stored in a field F250. This address is an address that is designated as the destination of transmission of electronic mail by the sender of this electronic mail. Again with reference to FIG. 1, this address corresponds to the address "◯◯@abc.ne.jp" of mail server 182 if, for example, the user of information communication terminal 180 sends electronic mail. Here, the type of data structure in DB for registered persons 120 is not limited to that shown in FIG. 2.

With reference to FIG. 3, the data structure of DB for mail 130 in data converter 100 according to the present embodiment is described. FIG. 3 is a conceptual diagram showing the structure of communication information that is stored in DB for mail 130 of data converter 100. This communication information includes, for example, electronic mail.

As shown in FIG. 3, the mail address of a recipient is stored in a field F310. The address of a sender of electronic mail is stored in a field F320. The data describing the time and date of transmission of electronic mail is stored in a field F330. Data describing the subject of electronic mail is stored in a field F340. Here, subject refers to title information that is added before the main text of electronic mail. The main text of electronic mail is stored in a field F350. Data of this main text does not exceed the predetermined capacity (for example, several hundred kilobytes). Data describing where a file is stored is stored in a field F360. This place for storage includes an address where the data of the file that is attached to electronic mail is stored. Here, as for communication information to which no file is attached, data describing this, for example, "NULL" is stored.

The data structure shown in FIG. 3 is entirely conceptual, and the type of data structure is not limited to this. In addition, address information that is stored in field F360 may be, for example, stored in the same manner instead of the main text data of electronic mail that is stored in field F350. In this case, data that is referred to is stored in another region, and therefore, the main text data of mail can be easily specified and referred to.

With reference to FIG. 4, the data structure in DB for documents 140 in data converter 100 according to the present embodiment is described. FIG. 4 is a diagram showing the way in which a file that is attached to electronic mail is stored. Data regions D410 to D440 are regions where files that are attached to electronic mail are stored.

As shown in FIG. 4, a file "document 1.TEXT," for example, is stored in a data region D410 between addresses "1000" and "1010." In the same manner, a file "document 2.TEXT," for example, is stored in a data region D420 between addresses "1010" and "1100." This address information is generated on the basis of a predetermined standard when mail receiving agent 112 of control part 110, for example, receives electronic mail and stores an attached file. This address may be generated in, for example, a vacant region following the preset order in DB for documents 140 in some cases, or may be generated in such a manner as to be stored in a data region that has been preset for each type of file in other cases. In this way, management of attached files can be made easy. Here, the way in which files are stored is not limited to that shown in FIG. 4.

Figure 5A:
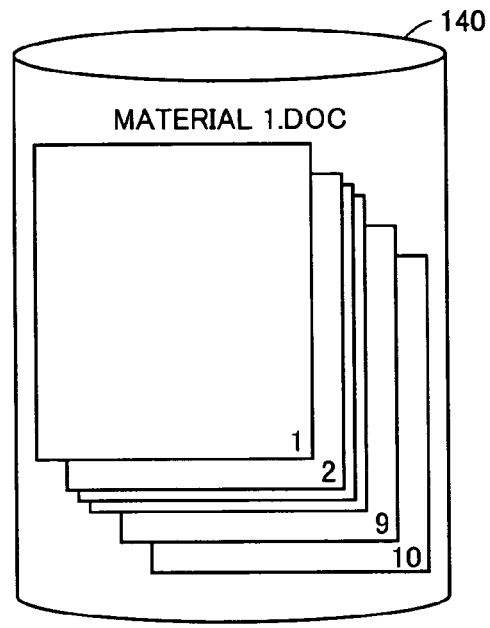
FIG. 5A is another conceptual diagram showing the data structure in the database for documents in the data converter shown in FIG. 1.
Figure 5B:
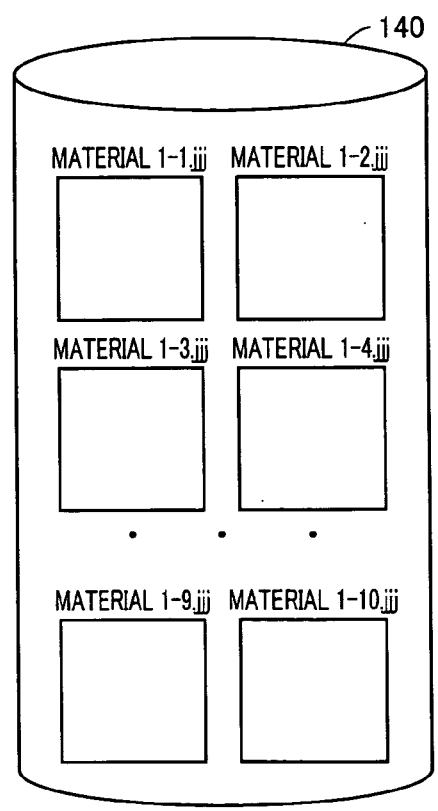
FIG. 5B is still another conceptual diagram showing the data structure in the database for documents in the data converter shown in FIG. 1.
Figure 5C:
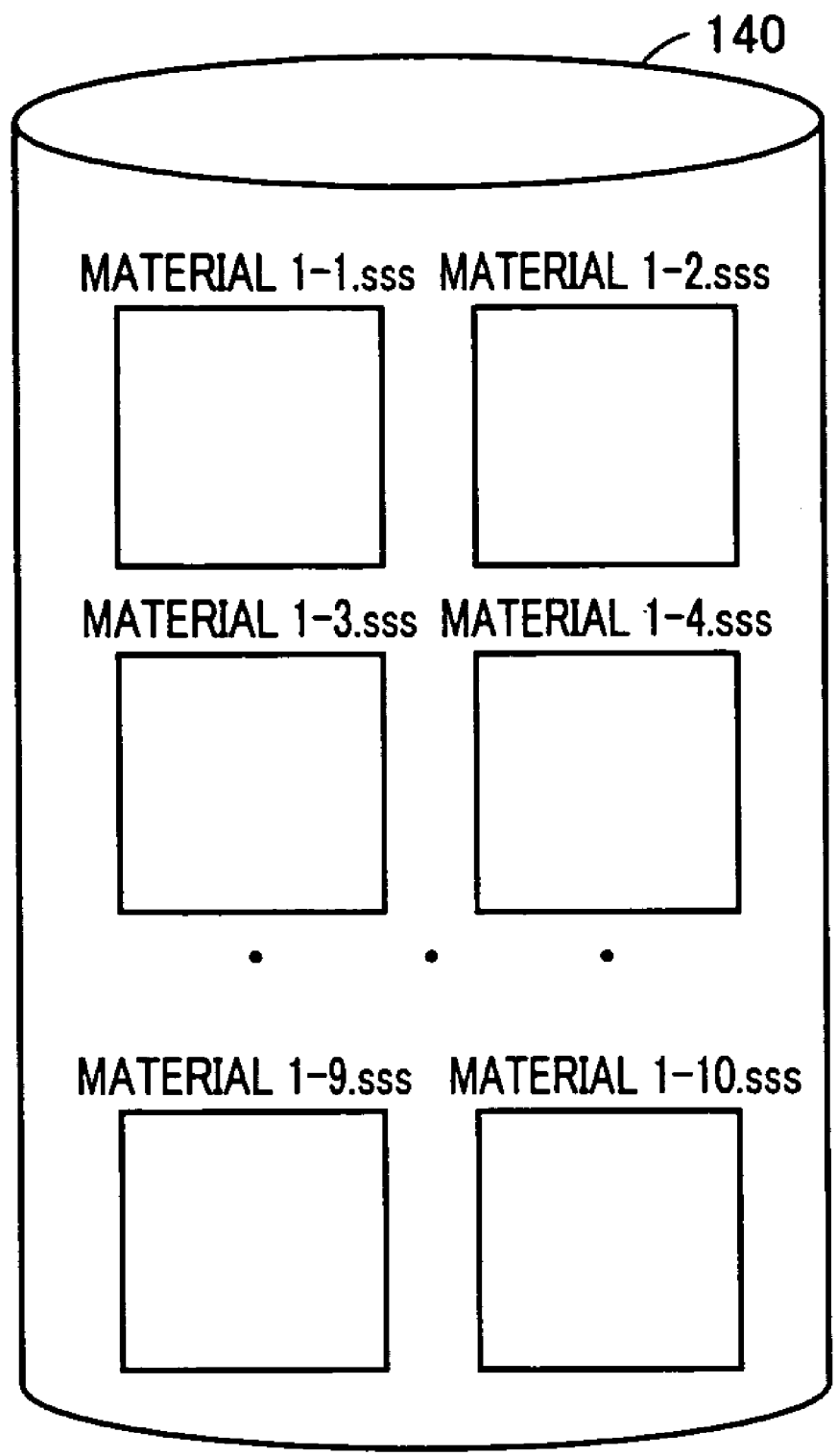
FIG. 5C is yet another conceptual diagram showing the data structure in the database for documents in the data converter shown in FIG. 1.

With reference to FIGS. 5A to 5C, the data structure in DB for documents 140 in data converter 100 according to the present embodiment is further described. FIG. 5A is a conceptual diagram showing the way in which data of a file "material 1.DOC" that has been attached to electronic mail stored before data conversion. FIGS. 5B and 5C are conceptual diagrams showing the way in which data of this file "material 1.DOC" is stored after data conversion.

As shown in FIG. 5A, if the attached file "material 1.DOC" is document data covering ten pages, for example, data for ten pages is stored in DB for documents 140. Here, FIG. 5A does not show that it is indispensable for a file having a plurality of pages to be divided in advance into separate pages before the below described conversion process. In this case, the attached file may be divided into separate pages in advance, before the below described conversion process for recording, or may be recorded as one file without being divided.

In addition, these pages may be pages which have been preset for each document editing program that is run in, for example, data converter 100, or may be pages which have been preset in data converter 100 without depending on such a program.

When data conversion is executed through the below described predetermined process, as shown in FIG. 5B, files resulting from data conversion of each page are generated for the attached file "material 1.DOC." In the case of FIG. 5B, the number of pages in the attached file "material 1.DOC" before conversion is 10, and therefore, a file after data conversion is generated for each page.

In addition, in some cases, data converter 100 according to the present embodiment has a plurality of data converting functions installed in advance. In such cases, a file is generated for each converting function, and therefore, as shown in FIG. 5C, for example, files having data formats which are different from the format of the file shown in FIG. 5B are generated.

Here, the way in which files are converted includes, for example, a way for converting the file to a file that is expressible on the basis of a bit map or other raster data, and a way for converting the file to a file that is expressible on the basis of vector data. The way for converting a file on the basis of raster data includes, for example, a JPEG (joint photographic experts group) system. The way for converting a file on the basis of vector data includes, for example, an SVG (scalable vector graphics) system. Here, the way for converting a file is not limited to any of the above-described ways, and may be a way for converting a file where a file of which the abstract can be seen is generated, or a way for converting a file where a file that includes a geometrical graphic element or the like, or more specifically, a file of which the information can be clearly recognized even at the time of enlarging, can be generated.

Figure 6:
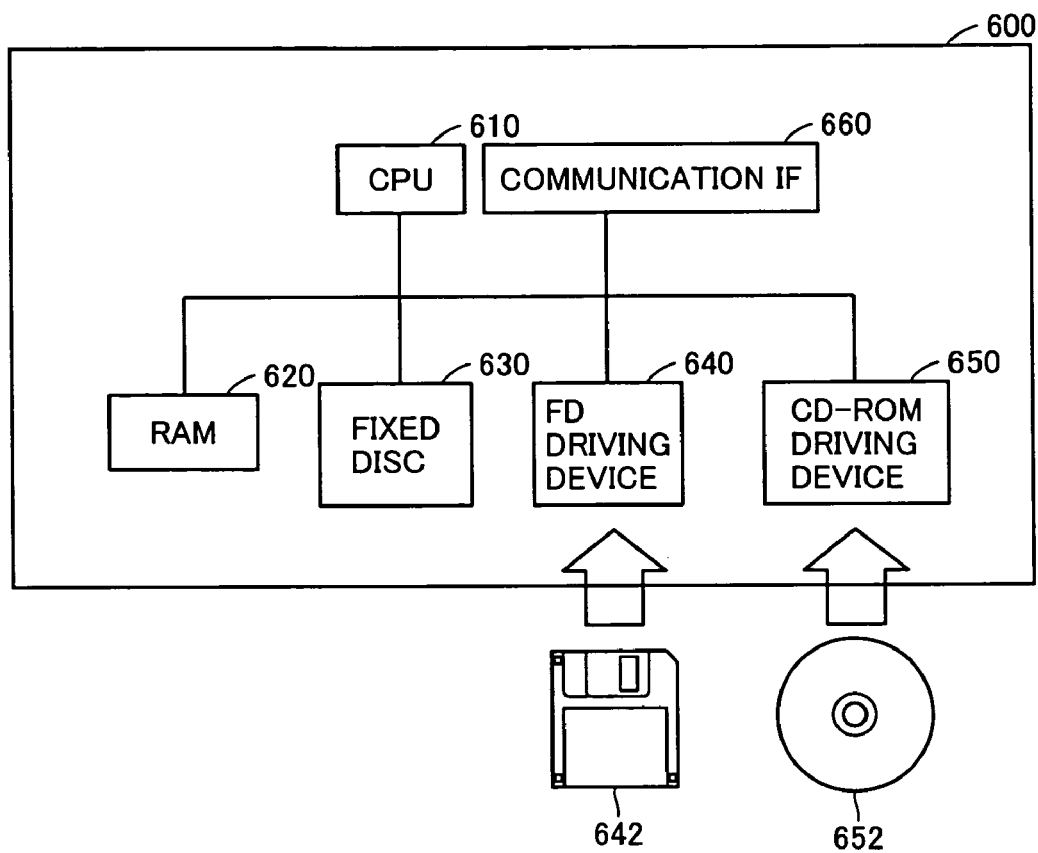
FIG. 6 is a block diagram showing the hardware configuration of a computer system that forms the data converter shown in FIG. 1.

With reference to FIG. 6, a computer system 600 that forms data converter 100 according to the present embodiment is described. FIG. 6 is a block diagram showing the hardware configuration of computer system 600.

As shown in FIG. 6, this computer system 600 includes a CPU (central processing unit) 610, a RAM (random access memory) 620, a fixed disc 600, an FD (flexible disc) driving device 640, a CD-ROM (compact disc read only memory) driving device 650 and a communication IF 660 which are connected to each other through data buses. An FD 642 is inserted in FD driving device 640. A CD-ROM 652 is inserted in CD-ROM driving device 650.

CPU 610 functions as control part 110 in data converter 100 shown in FIG. 1. Fixed disc 630 functions as DB for registered persons 120, DB for mail 130 and DB for documents 140 in data converter 100. Accordingly, fixed disc 630 may be formed as, for example, one hard disc device, a plurality of hard disc devices or a hard disc device which is divided by a plurality of partitions. In addition, a server device, such as a DB server or a file server, which is connected to the outside as a data memory device for storing data may be used instead of the computer system in which fixed disc 630 is built in as described above.

CPU 610 executes a process as mail receiving agent 112 of control part 110, mail transmitting agent 114, WEB server and WEB mail 116 and document converting engine 118 when a program which presets the process is run. The procedure and concrete contents of this process is described below.

As described above, the process in computer system 600 which realizes data converter 100 is executed by the hardware and software that is run in CPU 610. This software may, in some cases, be stored in advance in RAM 620 or fixed disc 630. Alternatively, in some cases, the software may be stored in FD 642, CD-ROM 652 or other recording mediums for distribution so as to be read out from this recording medium by FD driving device 640 or CD-ROM driving device 650 and once stored in fixed disc 630. This software is read out from fixed disc 630 and run by CPU 610. The hardware of computer system 600 shown in FIG. 6 is of a conventional type. Accordingly, it can be said that the most essential portion of the present invention is the software that is recorded in RAM 620, fixed disc 630, FD642, CD-ROM 652 and other recording media. Here, the operation of each piece of hardware in this computer system 600 is well-known, and therefore, the description thereof is not repeated here.

With reference to FIG. 7, screens which are displayed on portable communication terminal 170 which is connected to data converter 100 according to the present embodiment are described. FIG. 7 is a diagram showing the transition between screens which are displayed on a monitor 172 of portable communication terminal 170.

When the user of information communication terminal 180 transmits electronic mail to which a file is attached to the mail address of portable communication terminal 170, the message of forwarded mail that is generated by data converter 100 is transmitted to portable communication terminal 170. This message is displayed on monitor 172 (screen (A)).

When the user of portable communication terminal 170 accesses the displayed URL, a screen for validation of the user is displayed on monitor 172 (screen (B)) in accordance with the data that has been generated by data converter 100 on the basis of a predetermined standard. This screen displays a message prompting the user to input a password, as well as a region for inputting the password.

When the user clicks the portion showing login after inputting the password that has been registered in advance, if this password is valid, that is, correct, a list of mails of the user (for example, Mr. ○○) of portable communication terminal 170 is displayed on monitor 172 (screen (C)). The list on screen (C) is, for example, displayed on monitor 172 on the basis of the data that is stored in DB for mail 130 of data converter 100, as shown in FIG. 3.

When the user selects the subject of mail to be viewed from the list shown on monitor 170 and decision of selection is inputted in a predetermined manner (for example, by clicking a certain button), the main text corresponding to this subject is displayed (screen (D)). The electronic mail selected by the user of portable communication terminal 170 includes an attached file, which is shown on monitor 172, for example, in the form of an attached list 710.

When the user selects and clicks the file that is included in attached list 710, each page of this attached file is displayed on monitor 172 as a small image (screen (E)). This image is displayed on the basis of image data which is stored in DB for documents 140 of data converter 100. This image is an image which is generated so as to correspond to each file after data conversion.

When the user selects a display to be viewed from this display, the selected file is enlarged and displayed within the frame of monitor 172 (screen (F)). This display is based on data in JPEG format or SVG format that has been compressed on the basis of a predetermined standard.

In addition, when the user selects a file which he/she desires to receive from the displayed list and initiates a predetermined operation, for example, a process for downloading a file, the selected file is read out from DB for documents 140 of data converter 100 and transmitted to portable communication terminal 170. In this case, each file is made up of data that has been converted in accordance with the attribute data of portable communication terminal 170, and therefore, portable communication terminal 170 can receive files without hindrance. The received file is displayed on monitor 172 together with, for example, the URL (screen (G)).

With reference to FIG. 8, the configuration of electronic mail that is sent via data converter 100 is described below. FIG. 8 is a conceptual diagram showing the data structure of electronic mail.

In FIG. 8, data sequence 810 (that is to say, "multipart/mixed") means that a plurality of parts are sent together. Data sequence 820 (that is to say, "boundary") means a letter sequence which represents sections in the main text of electronic mail and in the attached data. Each data sequence 830 includes the same letter sequence as data sequence 820. Accordingly, these data sequences 830 mean that data is sectioned in these portions. Data sequence 840 (that is to say, "text/plain") means a mere text.

Data sequence 850 (that is to say, "image/jpeg") means that the image is an image in JPEG format. Data sequences 860 (that is to say, "sample.jpg") mean a concrete file name. Here, in this case, data sequence 860 which becomes the object for actual read-in from among the plurality of data sequences 860 is different, depending on the application that reads in this file. Data sequence 870 (that is to say, "base64") means that coding is in binary in base64. Data sequence 880 (that is to say, "attachment") means that a file is simply attached. Data sequence 890 means a binary sequence of JPEG image data. This data is coded by means of base 64, as described above.

In this manner, the electronic mail shown in FIG. 8 includes data sequences which represent attribute data that is required for the below described conversion process. Accordingly, data converter 100 can use the name of the file that is attached to this electronic mail, the type, the manner of coding, the data of the coded file, the manner of coding and other attribute data in accordance with the conversion process from these data sequences.

With reference to FIG. 9, an example of a binary sequence of JPEG image data is described below. FIG. 9 is a conceptual diagram showing a portion of the header portion of the binary sequence of this data.

General formats of JPEG include, for example, JFIF (JPEG format interchange format). In this case, as shown in FIG. 9, the binary sequence starts with "FFD8." Accordingly, in this case, whether or not the leading two bytes of data are "0×FF" and "0×D8," for example, may be confirmed, in order to determine whether or not the attached file is a file in JPEG format. Alternatively, if the attached file is compressed and a recovery process (so-called unfreezing process) of this file is executed, whether or not the data of this file does not have a problem as data in JPEG format may be determined.

Figure 10:
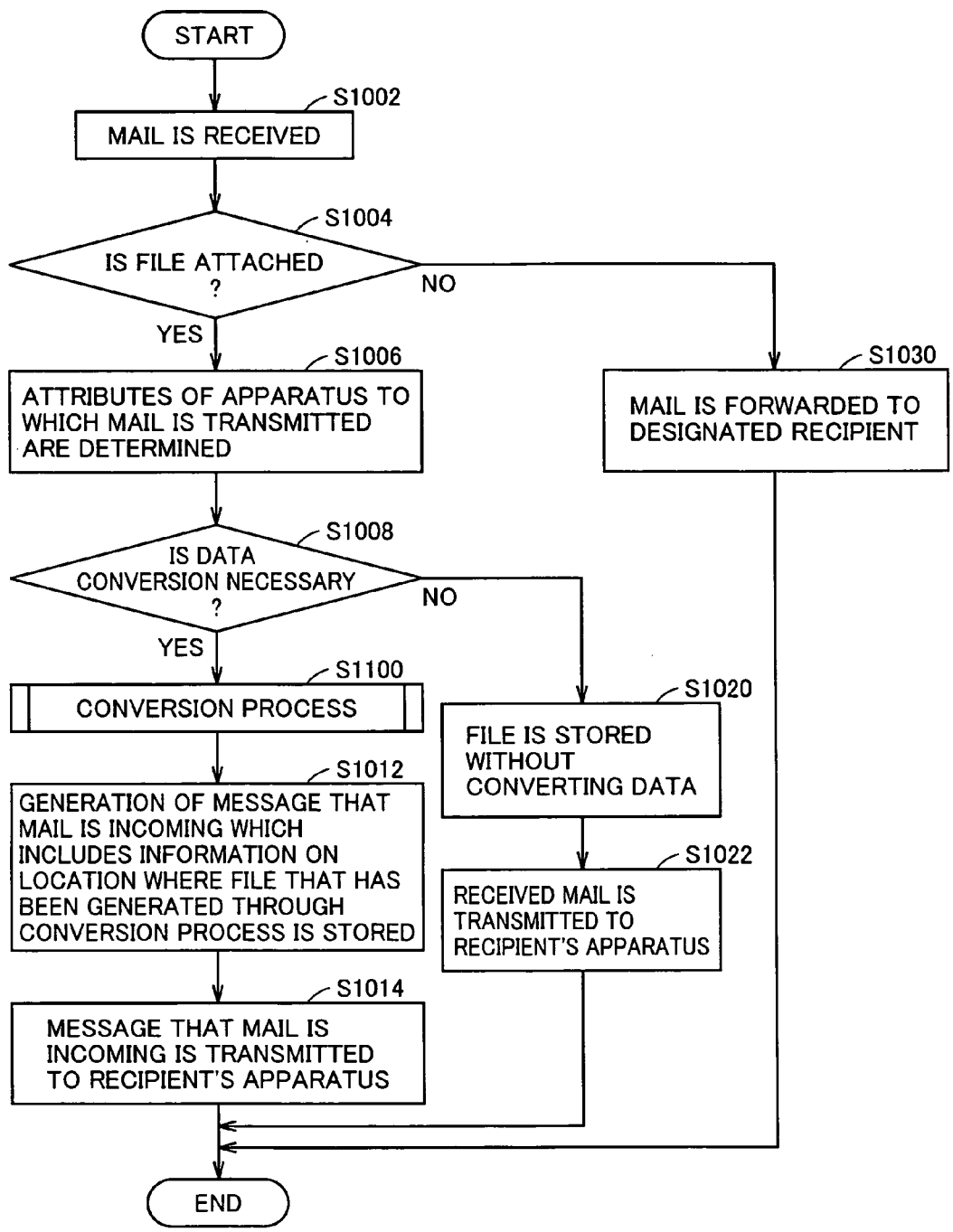
FIG. 10 is a flow chart illustrating the procedure of a process which is executed by the control part in the data converter according to the first embodiment of the present invention.

With reference to FIG. 10, the control structure of data converter 100 according to the first embodiment of the present invention is described below. FIG. 10 is a flow chart showing the procedure of the process that is executed by control part 110 of data converter 100.

In Step S1002, mail receiving agent 112 in control part 110 receives mail that has been transmitted from information communication terminal 180.

In Step S1004, control part 110 determines whether or not a file is attached to the received mail. This determination is made by referring to the header information of the received electronic mail (for example, data sequences 860 and 880 in FIG. 8). If no file is attached (YES in Step S1004), the process goes to Step S1006. If not (NO in Step S1004), the process goes to Step S1030.

In Step S1006, control part 110 determines the attributes of the apparatus to which the electronic mail is to be transmitted (forwarded). This determination is made on the basis of the data that has been registered in advance in, for example, DB for registered persons 120. Alternatively, the attributes of this apparatus may be determined on the basis of information that is included in the electronic mail (for example, the recipient's address).

In Step S1008, control part 110 determines whether or not data conversion is necessary for the file that is attached to the mail. This determination is made on the basis of, for example, the attributes of the apparatus that has been determined in Step S1006 or the attributes of the attached file. If it is determined that data conversion is required for the file (YES in Step S1008), the process goes to Step S1100. If not (NO in Step S1008), the process goes to Step S1020.

In Step S1100, control part 110 executes the conversion process described below. When this process is executed, the file that is attached to the received mail is converted to a file having a predetermined data format, and is stored in DB for documents 140.

In Step S1012, control part 110 generates a message that mail is incoming, which includes information on the location where the file that has been generated through the conversion process is stored (for example, the URL).

In Step S1014, mail transmitting agent 114 of control part 110 transmits the message that mail is incoming to the recipient's apparatus.

In Step S1020, control part 110 does not execute data conversion on the file that is attached to the received mail, but stores this file in DB for documents 140. That is to say, this process can be regarded as a non-conversion process of a file.

In Step S1022, mail transmitting agent 114 of control part 110 transmits the mail that has been received from information communication terminal 180 to the recipient's portable communication terminal 170.

In Step S1030, mail transmitting agent 114 of control part 110 forwards the mail to the designated recipient (for example, portable communication terminal 170) as it is.

Figure 11:
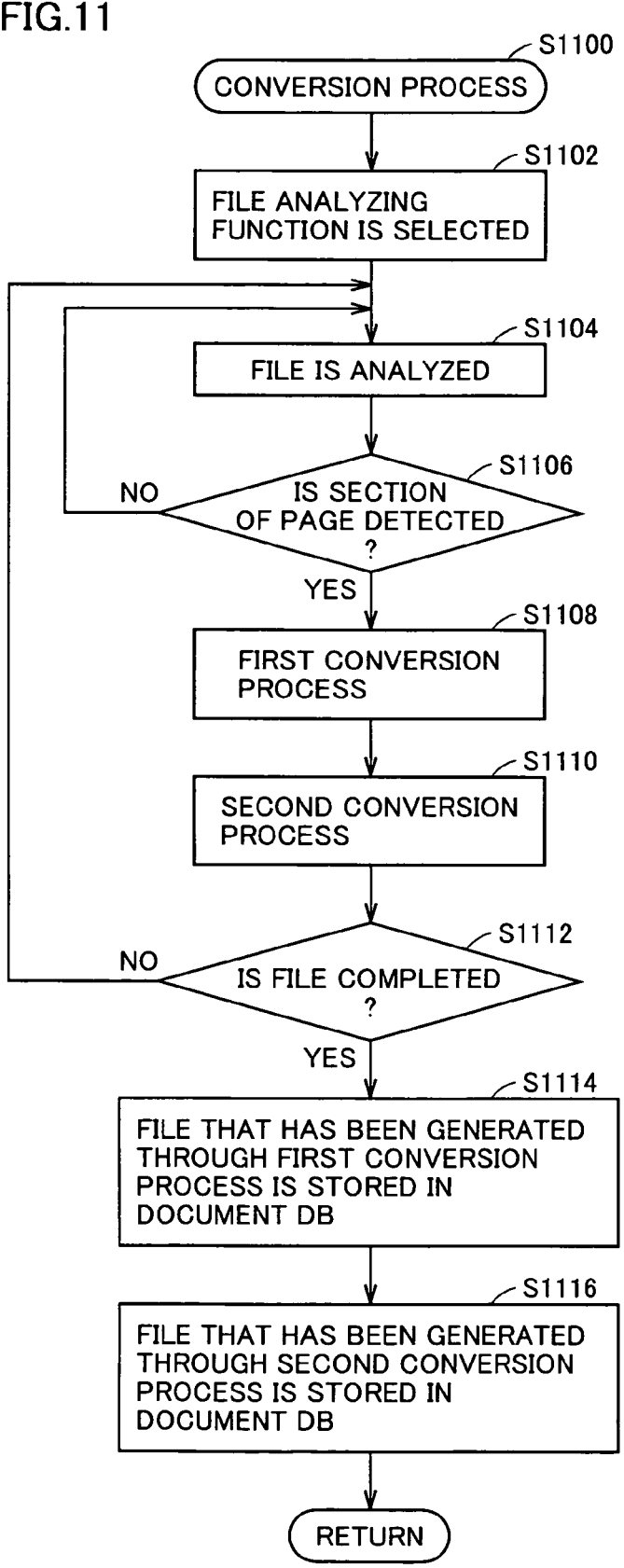
FIG. 11 is a flow chart illustrating the procedure of another process which is executed by the control part in the data converter according to the first embodiment of the present invention.

With reference to FIG. 11, the control structure of data converter 100 is further described. FIG. 11 is s flow chart showing the procedure of the conversion process which is executed by control part 110 of data converter. 100.

In Step S1102, control part 110 selects a file analyzing function. This selection is made on the basis of, for example, the attributes of the attached file (whether or not the file is a document file, whether or not the file is a file which stores spreadsheet data and the like).

In Step S1104, control part 110 analyzes the file that is attached to the received mail on the basis of the selected file analyzing function. Data for one predetermined page is generated as a result of this analysis of the data of the attached file.

In Step S1106, control part 110 determines whether or not a section of one page is detected in this file. If a section of one page is detected (YES in Step S1106), the process goes to Step S1108. If not (NO in Step S1106), the process returns to Step S1104.

In Step S1108, control part 110 executes a predetermined first conversion process. It is preferable for this first conversion process to be conversion of which an abstract image can be seen and having a high compression ratio, for example. In this process, a process for converting the original file to a file that is expressed in JPEG format, for example, is included. Here, this process may further include the step of executing an error process. If a process for scaling down a file cannot be executed so as to satisfy preset conditions, for example, the user may be notified that conversion is impossible.

In Step S1110, control part 110 executes a predetermined second conversion process. It is preferable for this second conversion process to clearly display information on an image if, for example, the image is enlarged and displayed. Here, in the same manner as in Step S1108, this may further include the step of executing an error process. This process includes a conversion process on the basis of, for example, vector data in SVG format or the like. A file having a data format that is generated through this process allows the information on an image of the file to be expressed with vector data when the display of this information is enlarged, and therefore, this information is clearly displayed.

In Step S1112, control part 110 determines whether or not the end portion of a file has been detected. If the end portion of a file has been detected, (YES in Step S1112), the process goes to Step S1114. If not (NO in Step S1112), the process returns to Step S1104.

In Step S1114, document converting engine 118 of control part 110 stores the file that has been generated through the first conversion process in DB for documents 140.

In Step S1116, document converting engine 118 of control part 110 stores the file that has been generated through the second conversion process in DB for documents 140.

Figure 12:
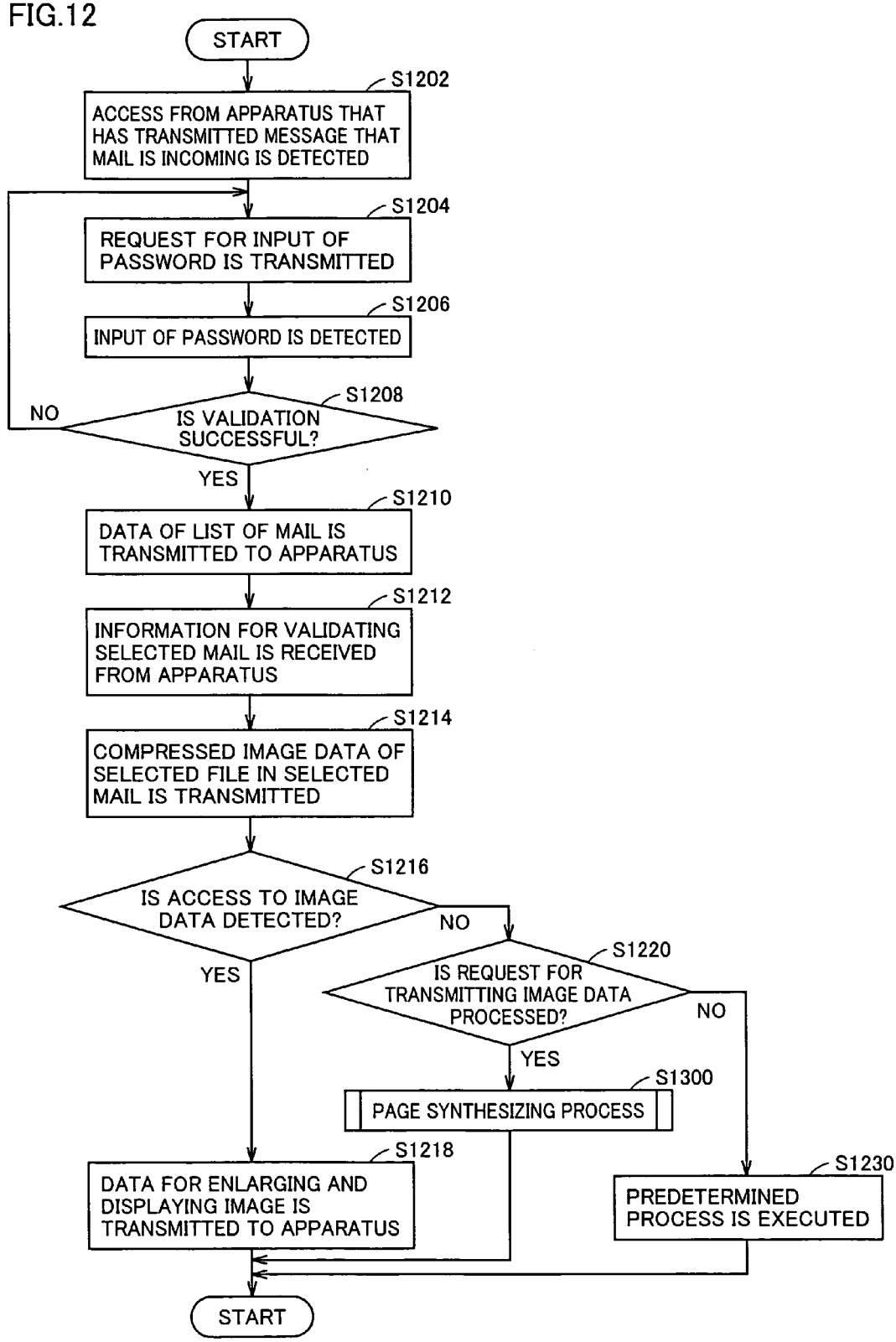
FIG. 12 is a flow chart illustrating the procedure of still another process which is executed by the control part in the data converter according to the first embodiment of the present invention.

With reference to FIG. 12, the control structure of data converter 100 is further described below. FIG. 12 is a flow chart illustrating the procedure of a process that is executed if control part 110 of data converter 100 is accessed by the apparatus which is the recipient of mail.

In Step S1202, control part 110 detects access from portable communication terminal 170 which has received a message that mail is incoming. If the user of portable communication terminal 170 initiates a process for connection to the URL that is displayed on the message that mail is incoming or other location data, for example, predetermined information is transmitted from portable communication terminal 170. When data converter 100 receives this information, access by portable communication terminal 170 is detected.

In Step S1204, control part 110 transmits a request for inputting a password to this apparatus. In Step S1206, control part 110 detects input of the password.

In Step S1208, control part 110 determines whether or not validation of the apparatus was successful. This determination is made by comparing, for example, the password that is stored in a predetermined manner with the password that has been sensed in Step S1206. If the validation of the apparatus is determined to be successful (YES in Step S1208), the process goes to Step S1210. If not (NO in Step S1208), the process returns to Step S1204.

In Step S1210, control part 110 transmits list data of mail to the apparatus. When portable communication terminal 170 receives this data, monitor 172 displays the list (for example, screen (C) in FIG. 7).

In Step S1212, control part 110 receives information for identifying mail that has been selected from this apparatus. This information is transmitted if the user of portable communication terminal 170 initiates a process for selecting a certain mail from the list. Here, the manner of transmission is not particularly limited, and may be a manner according to which selected information is transmitted in response to selection from a list.

In Step S1214, control part 110 transmits data of a scaled-down image of the file that has been converted regarding the selected mail.

In Step S1216, control part 110 determines whether or not access to image data has been sensed. If access to image data has been sensed (YES in S1216), the process goes to Step S1218. If not (NO in Step S1216), the process goes to Step S1220.

In Step S1218, control part 110 transmits data for display of an enlarged image to this apparatus. Though this data is one for displaying an image in, for example, SVG format, it may be of another data format.

In Step S1220, control part 110 determines whether or not a request for transmitting image data has been sensed. If a request for transmitting image data is sensed (YES in Step S1220), the process goes to Step S1300. If not (NO in Step S1220), the process goes to Step S1230.

In Step S1230, control part 110 executes a predetermined process. In this process, a process for transmitting image data to portable communication terminal 170 without executing any specific process is included.

In Step S1300, control part 110 executes the below described page synthesizing process. When this process is executed, a file which is merged with a certain page that has been selected by the user of the apparatus is generated, and this file is transmitted to this apparatus. Here, merge means a process for preparing one file through synthesis of a selected page. This process is for executing synthesis in the ascending order of the selected pages. Here, the manner according to which this merging process is executed is not particularly limited.

Figure 13:
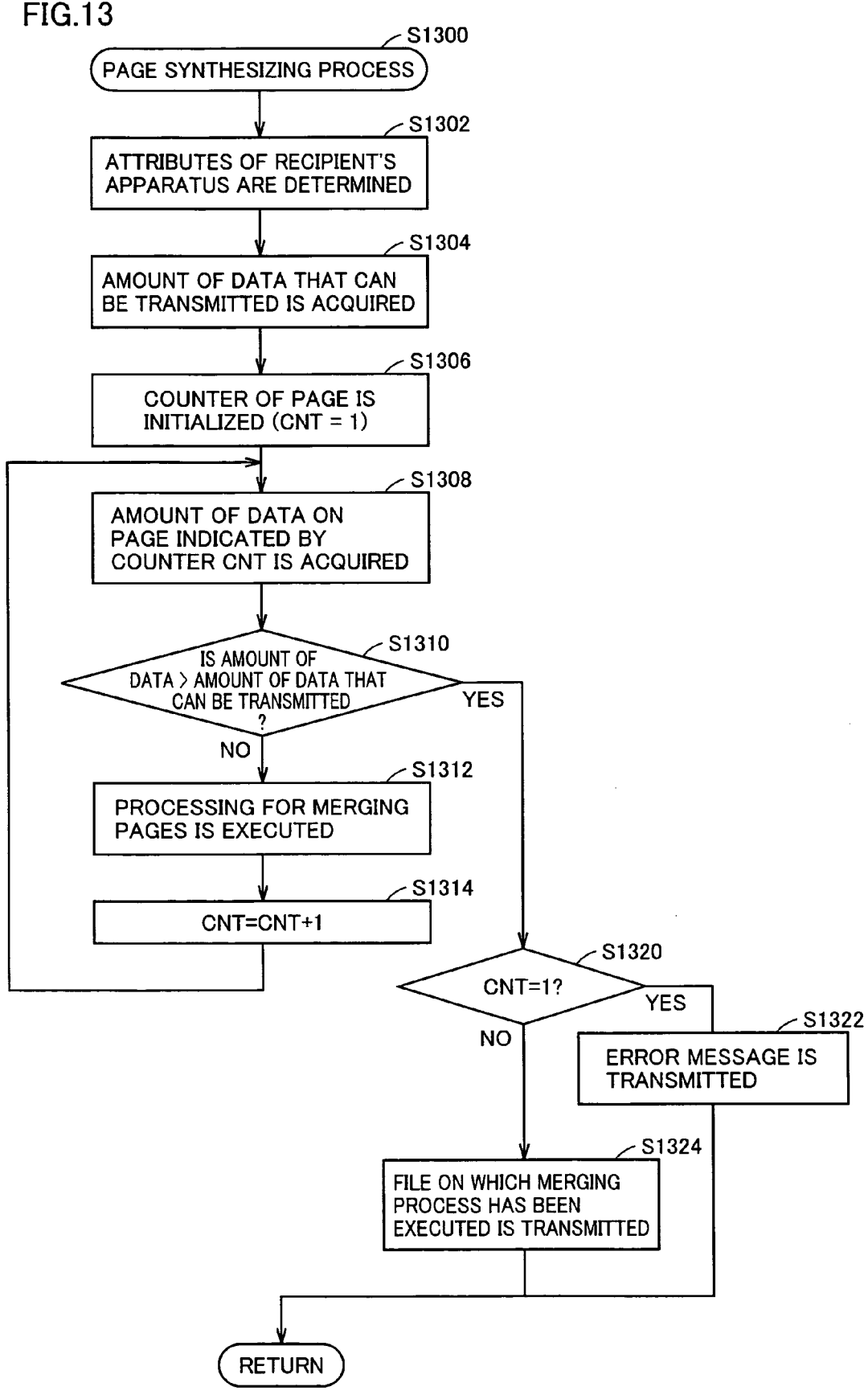
FIG. 13 is a flow chart illustrating the procedure of yet another process which is executed by the control part in the data converter according to the first embodiment of the present invention.

With reference to FIG. 13, the control structure of data converter 100 is further described below. FIG. 13 is a flow chart showing the procedure of the page synthesizing process which is executed by control part 110 of data converter 100.

In Step S1302, control part 110 determines the attributes of the recipient's apparatus. In Step S1304, control part 110 acquires the amount of data that can be transmitted to this apparatus. Though this amount of data relates to the data that is stored in advance in, for example, DB for registered persons 120, it is not necessary for the data to be stored in advance. At the time of the start of processing, for example, a process for acquiring the amount of data is executed, and thereby, the amount of data that can be transmitted may be acquired.

In Step S1306, control part 110 initializes a counter CNT of pages. In Step S1308, control part 110 acquires the amount of data of pages counted by counter CNT.

In Step S1310, whether or not the acquired amount of data exceeds the amount of data that can be transmitted is determined. If the acquired amount of data exceeds the amount of data that can be transmitted (YES in Step S1310), the process goes to Step S1320. If not (NO in Step S1310), the process goes to Step S1312.

In Step S1312, control part 110 executes a merging process of pages. Here, merging process means a process for preparing one file by unifying the data of a selected page on the basis of a preset procedure, as described above. In Step S1314, control part 110 increases the value of counter CNT by one.

In Step S1320, control part 110 determines whether or not the value of counter CNT is "1." If the value of counter CNT is "1" (YES in Step S1320), the process goes to Step S1322. If not (NO in Step S1320), the process goes to Step S1324.

In Step S1322, control part 110 transmits an error message to the apparatus. This error message is, for example, a predetermined message and includes, for example, a message for notifying that synthesis of the page has failed.

In Step S1324, control part 110 transmits the file on which a merging has been executed to the apparatus.

The operation of data converter 100 according to the present embodiment is described below on the basis of the above-described structure and flow chart. In the following, the operation of notifying that mail to which a file is attached is incoming and the operation of transmitting a file in response to this notification are separately described.

[Operation of Notification]

When data converter 100 receives mail (Step S1002), if a file is attached (YES in Step S1004), the attributes of the apparatus which is the receiver of the mail are determined (Step S1006). If data converter 100 determines that data conversion is necessary (YES in Step S1008), data converter 100 starts the conversion process (Step S1100).

Data converter 100 uses the file analyzing function that has been selected on the basis of the attribute data of the file that is attached to the mail, and analyzes this file (Step S1104). When a section for a predetermined page is detected as a result of this analysis (Step S1106), the first conversion process (for example, the process of conversion to a file that is expressible in the data format of JPEG) and the second conversion process (for example, the process of conversion to a file that is expressible in the data format of SVG) are executed (Steps S1108 and S1110). When conversion has been executed through to the end of the file which is the object of conversion (YES in Step S1112), each file that is generated through the conversion is stored in DB for documents 140 (Steps S1114 and S1116).

When data converter 100 generates a message that mail is incoming which includes location data of the files that have been generated through the conversion process (Step S1012), this message is transmitted to portable communication terminal 170 (Step S1014).

[Operation of Transmitting File]

When the user of portable communication terminal 170 refers to the message that mail is incoming and executes a predetermined access operation, data converter 100 detects this access (Step S1202). If the user initiates a process for inputting a password and the process for validating access is successful (YES in Step S1208), data converter 100 transmits data which displays a list of mails to portable communication terminal 170 (Step S1210).

When data converter 100 receives information for selecting certain mail from portable communication terminal 170 (Step S1212), the data where the image of the contents of the file that has been attached to this mail is compressed is transmitted to this portable communication terminal 170 (Step S1214). When the user of portable communication terminal 170 requests transmission of certain image data (NO in Step S1216 and YES in Step S1220), data converter 100 executes a page synthesizing process on certain image data (Step S1300).

Data converter 100 acquires the amount of data that can be transmitted to portable communication terminal 170 (Step S1304) and, if the total amount of data on the selected pages does not exceed the amount of data that can be transmitted (NO in Step S1310), data converter 100 executes a process for merging pages (Step S1312). When the total amount of this data exceeds the amount of data can be transmitted (YES in Step S1310), if a merging process has been executed on the selected pages (NO in Step S1320), data converter 100 transmits the file that has been generated through the merging process to portable communication terminal 170 (Step S1324). As a result, portable communication terminal 170 can receive a file that includes a page that is desired to be viewed.

As described above, data converter 100 according to the present invention converts the data format of a file that is attached to electronic mail in accordance with the attributes of the information apparatus which is the receiver of this mail, and stores the resulting file in a memory device. The format of this file is a data format which does not depend on the application program of the information apparatus. Data converter 100 transmits the image of the file that has been converted in this manner to the information apparatus which is the recipient of the electronic mail.

In this manner, even if a file that is expressible in a data format that cannot be referred to by means of the application of the information apparatus is attached to electronic mail so as to be transmitted from another information apparatus, the information apparatus can refer to the contents of the file as a picture image. As a result, a data converter which can convert document data to data that can be viewed without depending on the manner in which the image in the information apparatus is displayed can be provided.

Second Embodiment

In the following, the second embodiment of the present invention is described. The data converter according to the present embodiment is different from that of the first embodiment in that it has a function of selectively executing a process for converting a file from among a plurality of processes. Here, the data converter according to the present embodiment has the same hardware configuration as the above-described data converter 100 according to the first embodiment. The functions of the two are also the same. Accordingly, these descriptions are not repeated herein.

Figure 14:
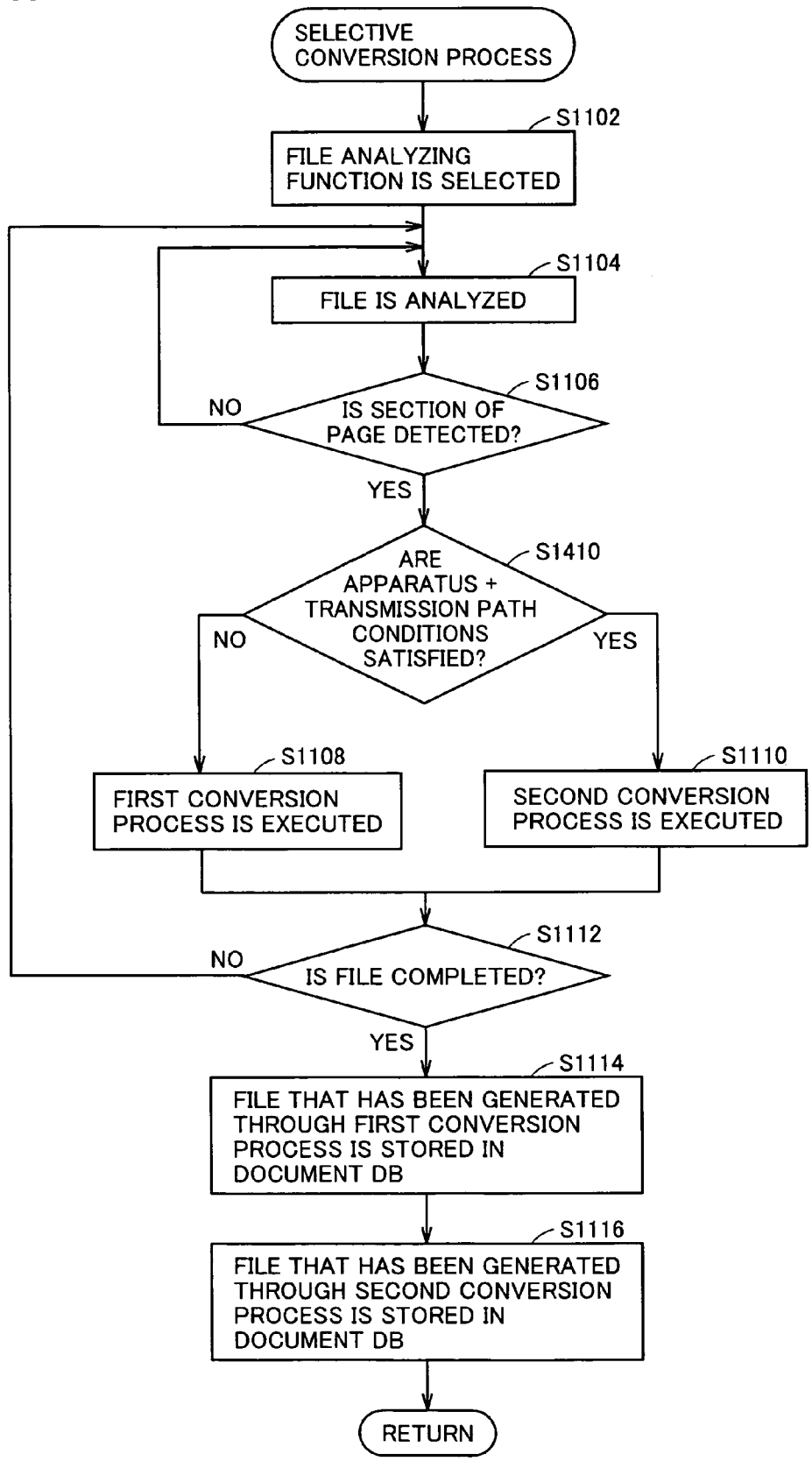
FIG. 14 is a flow chart illustrating the procedure of a process which is executed by the control part in the data converter according to the second embodiment of the present invention.

With reference to FIG. 14, the control structure of data converter 100 according to the present embodiment is described below. FIG. 14 is a flow chart showing the procedure of a selective conversion process which is executed by control part 110 of data converter 100. Here, the same step numbers are attached to processes which are the same as the processes in the above-described first embodiment, and the descriptions of these are not repeated. In addition, the process that is shown in FIG. 14 is executed instead of Step S1100 in the main process shown in FIG. 10.

In Step S1410, control part 110 determines whether or not the attribute data of the file satisfies the conditions of the apparatus and transmission path. Here, though the conditions of the transmission path include, for example, the amount of data that can be transmitted, they may be other conditions. If the attribute data of the file satisfies these conditions (YES in Step S1410), the process goes to Step S1110. If not (NO in Step S1410), the process goes to Step S1108.

The operation of the data converter according to the present embodiment is described on the basis of the above-described structure and flow chart. Here, the descriptions of the operation that is the same as that of the above-described first embodiment are not repeated.

When data converter 100 determines that the attributes of a file that is attached to mail satisfy the conditions of the apparatus of the recipient and the transmission path (YES in Step S1410), the second conversion process is executed (Step S1110).

As described above, the data converter according to the present embodiment has a standard for, for example, determining whether or not the conditions for the apparatus and the transmission path are satisfied, and thereby, can selectively execute a process for converting a file. As a result, a file can be generated in accordance with the conditions of the information apparatus or transmission path.

Third Embodiment

In the following, the third embodiment of the present invention is described. The data converter according to the present embodiment is different from each of the above-described embodiments in that it has a function of converting a file that has been stored in advance inside the converter.

Figure 15:
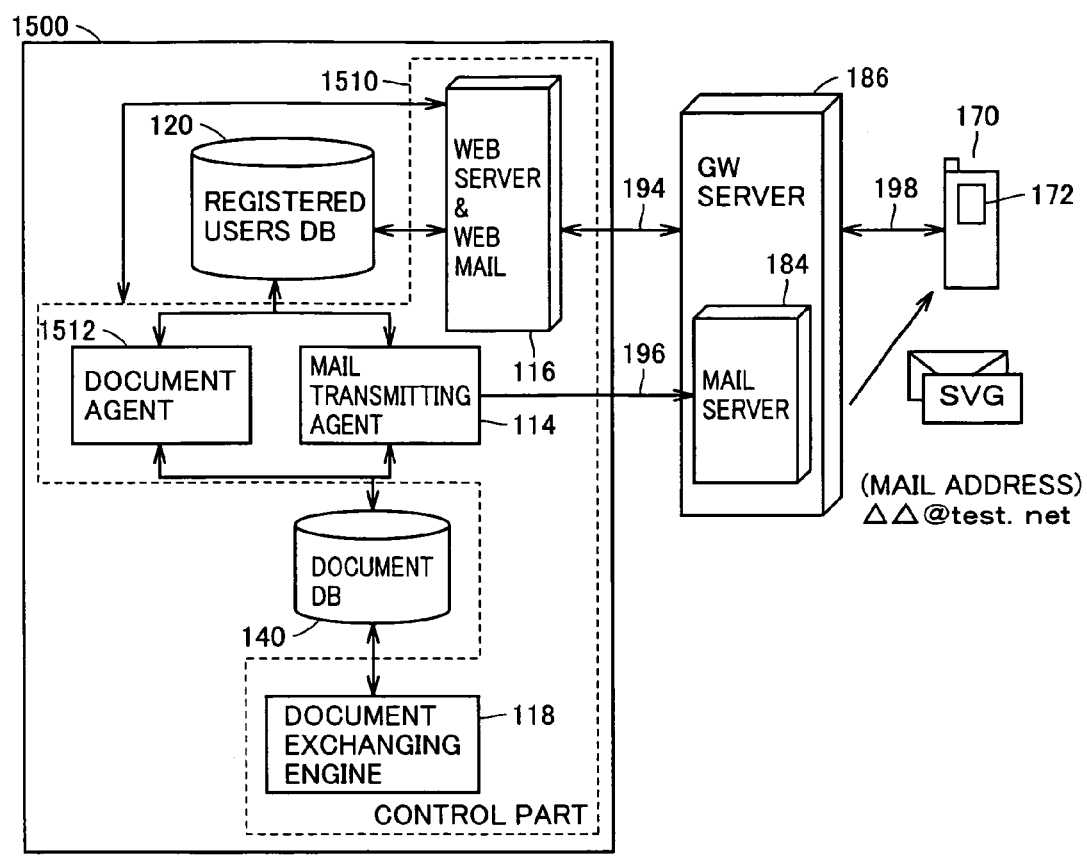
FIG. 15 is a diagram schematically showing a communication system where a data converter according to the third embodiment of the present invention is used.

With reference to FIG. 15, the configuration of a data converter 1500 according to the present embodiment is described. FIG. 15 is a schematic diagram showing a communication system where data converter 1500 is used.

As shown in FIG. 15, data converter 1500 includes a control part 1510, a DB (database) for registered persons 120 and a DB for documents 140. Control part 1510 includes a document agent 1512, a mail transmitting agent 114, a WEB server & WEB mail agent 116, and a document converting engine 118.

Data converter 1500 according to the present embodiment has a configuration that is different from that of data converter 100 shown in FIG. 1 in that it has document agent 1512. The other portions of the hardware configuration are the same as in the above-described embodiments, and therefore, the descriptions thereof are not repeated here.

Document agent 1512 exchanges predetermined information (for example, user information on portable communication terminal 170, the attributes of this terminal, the transmission capacity of a communication line and the like) with WEB server & WEB mail agent 116. Document agent 1512 outputs an instruction for converting a certain file on the basis of this information, and makes document converting engine 118 convert this file and store the resulting file in DB for documents 140.

Mail transmission agent 114 outputs this converted file to a mail server 184, and furthermore, transmits the file to portable communication terminal 170 via a network 198.

With reference to FIG. 16, the control structure of data converter 1500 according to the present embodiment is described. FIG. 16 is a flow chart showing the procedure of the process that is executed by control part 1510 in data converter 1500. Here, the same step numbers are attached to processes that are the same as the processes in the above-described embodiments, and the descriptions of these are not repeated.

In Step S1502, control part 1510 reads out a file from DB for documents 140. Though read-out of this file is executed when, for example, a new file is stored in DB for files 140 or when a preset time (for example, a predetermined day and time in every week) has come, the trigger for read-out is not limited to the above-described cases, and may be cases where other conditions are satisfied.

In Step S1504, control part 1510 determines the attributes of the apparatus which is the receiver of a file. Though the data on the basis of which this determination made can be, for example, data that was stored in advance in DB for registered persons 120, it may be other data. For example, if a file that has been read out has a header portion and this header portion includes information on an apparatus, the attributes of the apparatus can be determined on the basis of the data that is stored in each file.

In Step S1506, control part 1510 determines whether or not data conversion of the read out file is necessary. This determination is made on the basis of, for example, whether or not the attributes of the read out file and the attributes of the recipient's apparatus coincide with each other. For example, if the recipient's apparatus can read out the file that is stored in DB for documents 140 in its unchanged format, it is determined that data conversion is unnecessary. If it is determined that data conversion of the file is necessary (YES in Step S1506), the process goes to Step S1100. If not (NO in Step S1506), the process goes to Step S1510.

In Step S1510, control part 1510 transmits the read out file to the apparatus without executing data conversion.

In Step S1512, control part 1510 generates a message which includes information on the location where the file that has been generated through the conversion process is stored. This information includes predetermined address information and the like which is defined by, for example, the URL, or within the LAN in the case of an in-house LAN. In addition, though the message is a character string which is displayed in text, it may be graphics, an image or a message of another type.

In Step S1514, control part 1510 transmits this message to the recipient's apparatus. Here, the converted file may be transmitted as it is together with the message. In addition, though the recipient's apparatus is, for example, portable communication terminal 170 or a communication terminal of another type, it is not limited to this. For example, it may be a printing device.

The operation of data converter 1500 according to the present embodiment is described on the basis of the above-described structure and flow chart. Here, descriptions of operations that are the same as the operations in each of the above-described embodiments are not repeated.

Data converter 1500 reads out a file from DB for documents 140 (Step S1502) and determines the attributes of the recipient's apparatus (Step S1504). If data conversion of this file is necessary (YES in Step S1506), a predetermined conversion process is executed (Step S1100).

As described above, data converter 1500 according to the present embodiment reads out a file that has been stored in DB for documents 140 in advance and converts the data format of this file in accordance with the attributes of the recipient's apparatus. Because of this, it is not necessary to generate a file in advance in accordance with each of the attributes and store the file if, for example, the same file is transmitted to a plurality of information apparatuses having different attributes. Therefore, the data storage region of the memory device, for example, DB for documents 140, can be used efficiently and separate files can be shared, and therefore, sharing of information can be accelerated.

In addition, the timing for read-out of a file is set to, for example, a certain time, when a newly generated file is stored or when a file is updated, and thereby, the user who has access to data converter 1500 can be appropriately informed of updated information, and therefore, sharing of updated information can also be accelerated.

Fourth Embodiment

In the following, the fourth embodiment of the present invention is described. The data converter according to the present embodiment is different from the data converter according to the third embodiment in that it has a function of selectively executing a process for converting a file. Here, the hardware configuration of the data converter according to the present embodiment is the same as that of the third embodiment. Accordingly, the descriptions thereof are not repeated here.

The control structure of the data converter according to the present embodiment includes the selective conversion process shown in FIG. 14 instead of the conversion process in Step S1100 in the flow chart of FIG. 16. These processes are the same as the above-described processes, and therefore, the descriptions thereof are not repeated here.

The data converter having the above-described control structure selectively converts a file having layout information, and therefore, the type of conversion process can be set in advance for each information apparatus, and thereby, it is possible to generate only the file that is expressible on the basis of the necessary data format. In this manner, no files which are not required by the respective information apparatuses are generated, and therefore, the memory regions in DB for documents 140 and other memory apparatuses can be used effectively. In addition, it becomes unnecessary to manage such files, and therefore, efficiency can be increased insofar as the task of management is eliminated.

The embodiments disclosed herein are illustrative in all respects, and should not be considered as being limitative. The scope of the present invention is defined not by the above description but by the claims, and is intended to include meanings which are equivalent to the claims and all modifications within the scope.

INDUSTRIAL APPLICABILITY

The present invention can be applied to a relay device that forms an information communication network, for example, a data communication device that forms a mobile communication network.

The invention claimed is:

1. A data converter comprising:
   a reception portion receiving electronic mail;
   a conversion portion converting data included in a file attached to said electronic mail, said conversion portion including a first conversion portion converting said data included in said file attached to said electronic mail into data represented in a first predetermined data format, and a second conversion portion converting said data included in said file attached to said electronic mail into data represented in a second predetermined data format;
   a memory portion storing said data generated through conversion and represented in said first data format and said data generated through conversion and represented in said second data format; and
   a transmission portion transmitting said data output from said first and second conversion portions,
   wherein said data represented in said first data format includes data representing a list of either said converted file or said data generated through conversion,
   said data represented in said second data format is an image generated by conversion of said file, and
   said memory portion stores said list and said image in association with each other.

2. A portable communication terminal transmitting and receiving data to and from the data converter recited in claim 1, comprising:
   a first display portion receiving said data represented in said first data format to display said list of said file;
   a select portion selecting at least one file from said list of said displayed file;
   a notification portion notifying said data converter of said file selected by said select portion; and
   a second display portion receiving said data represented in said second data format that corresponds to said file that said notification portion notifies said data converter of to display an image.

3. The portable communication terminal according to claim 2, said second data format being a vector image format, the portable communication terminal further comprising a designation portion designating a scaling factor applied to display said image based on said data represented in said second data format, wherein said second display portion scales said image based on said scaling factor designated by said designation portion and displays said scaled image.

4. The data converter according to claim 1, further wherein the list of said converted file or said data generated through conversion is a list of converted portions of the file attached to said electronic mail, and wherein the image generated by conversion of said file is comprised of a plurality of images each corresponding to a respective portion of the file.

5. The data converter according to claim 1, wherein
said first data format is a raster format, and
said first conversion portion generates an image in the raster format from the data contained in the attached file by changing the compression ratio so as to satisfy a prescribed condition.

6. The data converter according to claim 1, wherein
said first data format is a vector format, and
said first conversion portion generates an image in the vector format from the data contained in the attached file by changing the compression ratio so as to satisfy a prescribed condition.

7. The data converter according to claim 1, wherein
said first data format is a raster format,
said second data format is a vector format,
said first conversion portion generates an image in the raster format from the data contained in the attached file, and
said second conversion portion generates an image in the vector format from the data contained in the attached file.

8. A method for a portable communication terminal receiving, from a data converter, each file converted in first and second data formats, said data converter including a function receiving electronic mail, a function converting data included in said electronic mail into said first and second data formats, and a function transmitting said converted data, the method comprising:
receiving at the portable communication terminal, from said data converter, at least one of files in said first and second data formats;
selecting at least one of files received by said reception portion; and
notifying said data converter of which file has been selected,
wherein said one of said files in said first and second data formats is data for reducing and displaying unconverted data, wherein said data for reducing and displaying unconverted data is raster data, and wherein data received after said data converter is notified of which file has been selected is vector data.

9. The method according to claim 8, further comprising requesting said data converter to transmit data for reducing and displaying unconverted data.

10. A portable communication terminal receiving, from a data converter, each file converted in first and second data formats, said data converter including a function receiving electronic mail, a function converting data included in said electronic mail into said first and second data formats, and a function transmitting said converted data, the portable communication terminal comprising:
a reception portion receiving, from said data converter, at least one of data in said first data format and said file in said second data format;
a select portion selecting at least one of files received by said reception portion; and
a notification portion notifying said data converter of which file has been selected,
wherein said one of said files in said first and second data formats is data for reducing and displaying unconverted data, wherein said data for reducing and displaying unconverted data is raster data, and wherein data received after said data converter is notified of which file has been selected is vector data.

11. The portable communication terminal according to claim 10, further comprising a request portion requesting said data converter to transmit data for reducing and displaying unconverted data.

12. A computer readable recording medium storing a program for causing a server device receiving electronic mail to function as a data converter, said server device including a memory portion storing data, the computer readable recording medium causing said server device to perform the steps of:
converting data included in a file attached to said electronic mail, wherein the step of converting data includes the steps of converting said data included in said file into data represented in a first predetermined data format, and converting said data included in said file into data represented in a second predetermined data format;
storing to said memory portion said data represented in said first and said second data formats that are generated as said data are converted; and
transmitting said data represented in said first and said second data formats that are generated by conversion of said data,
wherein said data represented in said first data format includes data representing a list of said converted file or said data generated through conversion,
said data represented in said second data format is an image generated by conversion of said file, and
the step of storing stores to said memory portion said data representing said list and said image in association with each other.

13. A computer readable recording medium storing a program causing a portable communication terminal to function as a display device, said portable communication terminal being capable of transmitting and receiving data to and from a server device for which the computer readable recording medium as recited in claim 12 is executed, the computer readable recording medium causing said portable communication terminal to perform the steps of:
receiving, from said server device, data represented in said first data format;
displaying a list of said file based on received data;
selecting at least one file from said displayed list;
receiving, from said server device, data represented in said second data format;
downloading, from said server device, data represented in said second data format that corresponds to said selected file; and
displaying an image corresponding to said file based on said downloaded data.

14. The computer readable recording medium according to claim 12, further wherein the list of said converted file or said data generated through conversion is a list of converted portions of the file attached to said electronic mail, and wherein the image generated by conversion of said file is comprised of a plurality of images each corresponding to a respective portion of the file.

* * * * *